(12) United States Patent
Nolting et al.

(10) Patent No.: US 6,298,123 B1
(45) Date of Patent: Oct. 2, 2001

(54) INTERCONNECT TRAFFIC TRACKING

(75) Inventors: Thomas A. Nolting, Holliston; William A. Howes, Millbury; Karen Dion, Dudley, all of MA (US)

(73) Assignee: Bell Atlantic Network Services, Inc., Arlington, VA (US)

( * ) Notice: Subject to any disclaimer, the term of this patent is extended or adjusted under 35 U.S.C. 154(b) by 0 days.

(21) Appl. No.: 09/306,636

(22) Filed: May 7, 1999

Related U.S. Application Data

(63) Continuation-in-part of application No. 09/188,680, filed on Nov. 10, 1998, which is a continuation-in-part of application No. 09/048,102, filed on Mar. 26, 1998.

(51) Int. Cl.$^7$ .............................. H04M 15/00; H04M 7/00
(52) U.S. Cl. ........................... 379/112; 379/229; 379/113
(58) Field of Search .................................. 379/112, 113, 379/133, 134, 34, 111, 221, 220, 229, 230, 115, 114, 207, 219

(56) References Cited

U.S. PATENT DOCUMENTS

| | | |
|---|---|---|
| 4,456,788 | 6/1984 | Kline et al. . |
| 4,464,543 | 8/1984 | Kline et al. . |
| 4,760,594 | 7/1988 | Reed . |
| 5,285,494 | 2/1994 | Sprecher et al. . |
| 5,333,183 | 7/1994 | Herber . |
| 5,359,649 | 10/1994 | Rosu et al. . |
| 5,425,087 | 6/1995 | Gerber et al. . |
| 5,434,845 | 7/1995 | Miller . |
| 5,438,570 | 8/1995 | Karras et al. . |
| 5,457,729 | 10/1995 | Hamann et al. . |
| 5,475,732 | 12/1995 | Pester, III . |
| 5,483,590 | 1/1996 | Chiu et al. . |
| 5,563,930 | 10/1996 | Pester, III . |
| 5,579,371 | 11/1996 | Aridas et al. . |
| 5,592,530 | 1/1997 | Brockman et al. . |
| 5,642,396 | 6/1997 | Cowgill . |
| 5,692,181 | 11/1997 | Anand et al. . |
| 5,712,908 | 1/1998 | Brinkman et al. . |
| 5,715,294 | 2/1998 | Pester, III . |
| 5,724,584 | 3/1998 | Peters et al. . |
| 5,737,399 | 4/1998 | Witzman et al. . |
| 5,757,895 | 5/1998 | Aridas et al. . |
| 5,768,352 | 6/1998 | Elliott et al. . |

(List continued on next page.)

OTHER PUBLICATIONS

"Gentia Software, Section 3: Query and Reporting Tools", by META Group, Inc., *Data Warehousing Tools Bulletin* (Aug. 1997); pp, 3615–3620.

*Primary Examiner*—Curtis Kuntz
*Assistant Examiner*—Rexford Barnie
(74) *Attorney, Agent, or Firm*—McDermott, Will & Emery

(57) ABSTRACT

Local exchange carriers (LECs) face increasingly stiff competition. The LECs provide interconnect services for many of the potentially competing carriers. To forecast business trends and manage its network, any carrier, particularly a LEC, needs to effectively estimate the size and revenue generating potentials of the business of the potentially competing carriers. In accord with the invention, monitor equipment on the one carrier's network forms detailed records from call related messages produced by that network for interconnect call traffic with another carrier's network. These records are loaded into a relational database. Preferably, a data preparation routine enhances the data, for example, by translating certain codes into text and by spreading usage data over predefined time intervals. An on-line analytical processing program runs one or more applications to analyze the interconnect traffic. The analysis provides traffic data regarding the current size and/or changes in the customer base of the other carrier. The analysis also provides estimates of different types of traffic processed by the other carrier's network, for example to estimate normal telephone grade services and higher rate services offered by the other carrier.

41 Claims, 8 Drawing Sheets

U.S. PATENT DOCUMENTS

| | | |
|---|---|---|
| 5,774,530 | 6/1998 | Montgomery et al. . |
| 5,793,839 | 8/1998 | Farris et al. . |
| 5,802,145 | 9/1998 | Farris et al. . |
| 5,809,120 | 9/1998 | Montgomery et al. . |
| 5,825,769 | 10/1998 | O'Reilly et al. . |
| 5,828,729 | 10/1998 | Clermont et al. . |
| 5,835,583 | 11/1998 | Hetz et al. . |
| 5,838,682 | 11/1998 | Dekelbaum et al. . |
| 5,838,769 | 11/1998 | McNeil et al. . |
| 5,838,796 | 11/1998 | Mittenthal . |
| 5,844,981 | 12/1998 | Pitchford et al. . |
| 5,850,426 | 12/1998 | Watkins et al. . |
| 5,852,819 | 12/1998 | Beller . |
| 5,854,834 | 12/1998 | Gottlieb et al. . |
| 5,854,835 | 12/1998 | Montgomery et al. . |
| 5,864,608 | 1/1999 | Brownmiller et al. . |
| 5,867,558 | 2/1999 | Swanson . |
| 5,867,565 | 2/1999 | Morikawa . |
| 5,875,238 | 2/1999 | Glitho et al. . |
| 5,881,140 | 3/1999 | Gerault et al. . |
| 5,896,445 * | 4/1999 | Kay et al. ............... 379/135 |
| 5,901,208 | 5/1999 | Jabbarnezhad . |
| 5,905,785 * | 5/1999 | Dunn et al. ............. 379/113 |
| 5,905,985 | 5/1999 | Malloy et al. . |
| 5,907,603 | 5/1999 | Gallagher et al. . |
| 5,917,898 | 6/1999 | Bassa et al. . |
| 5,933,490 * | 8/1999 | White et al. ............ 379/221 |
| 5,937,042 | 8/1999 | Sofman . |
| 5,940,471 | 8/1999 | Homayoun . |
| 5,949,862 | 9/1999 | Fukuzawa et al. . |
| 5,999,604 | 12/1999 | Walter . |
| 6,011,838 * | 1/2000 | Cox ........................ 379/113 |
| 6,052,447 * | 4/2000 | Golden et al. .......... 379/114 |
| 6,052,448 | 4/2000 | Janning . |
| 6,067,354 | 5/2000 | Bauer et al. . |
| 6,075,848 | 6/2000 | Lunn et al. . |
| 6,078,647 * | 6/2000 | D'Eletto ................... 379/34 |
| 6,112,238 | 8/2000 | Boyd et al. . |
| 6,141,412 | 10/2000 | Smith et al. . |

* cited by examiner

INTERCONNECT TRAFFIC TRACKING

CROSS-REFERENCE TO RELATED APPLICATION

This application is a continuation-in-part of U.S. patent application Ser. No. 09/188,680 filed on Nov. 10, 1998 entitled INTERCONNECT TRAFFIC ANALYSIS, which is a continuation-in-part of U.S. patent application Ser. No. 09/048,102 filed on Mar. 26, 1998 entitled NETWORK PLANNING TRAFFIC MEASUREMENT PROGRAM, the disclosures of both of which are entirely incorporated herein by reference.

TECHNICAL FIELD

The present invention relates to methods and systems for analyzing call specific data records for interconnect traffic between different carriers' portions of a telecommunication network, in order to allow one carrier to analyze the customer base and traffic patterns of the other carrier.

Acronyms

The written description uses a large number of acronyms to refer to various services, messages and system components. Although generally known, use of several of these acronyms is not strictly standardized in the art. For purposes of this discussion, acronyms therefore will be defined as follows:

Address Complete Message (ACM)
Asynchronous Digital Subscriber Line (ADSL)
ANswer Message (ANM)
Automatic Message Accounting (AMA)
Call Detail Record (CDR)
Calling Party Number (CPN)
Carrier Identification Code (CIC)
Centi-Call Seconds (CCS)
Central Office (CO)
Competitive Local Exchange Carrier (CLEC)
Common Channel Interoffice Signaling (CCIS)
Common Language Location Identifier (CLLI)
Customer Record Information System (CRIS)
Destination Point Code (DPC)
End Office (EO)
Global Title Translation (GTT)
Initial Address Message (IAM)
Integrated Services Digital Network (ISDN)
ISDN User Part (ISDN-UP or ISUP)
Inter-exchange Carrier (IXC)
Internet Service Provider (ISP)
Landing Zone (LZ)
Line Identification DataBase (LIDB)
Local Area Network (LAN)
Local Exchange Carrier (LEC)
Loop Maintenance Operations Systems (LMOS)
Message Signaling Unit (MSU)
Message Transfer Part (MTP)
Minutes of Use (MOU)
Mobile Switching Center (MSC)
Multi-Dimensional DataBase (MDDB)
Numbering Plan Area (NPA)
Online Analytical Processing (OLAP)
Origination Point Code (OPC)
Operations, Maintenance Application Part (OMAP)
Personal Communication Service (PCS)
Personal Computer (PC)
Private Branch Exchange (PBX)
Public Switching Telephone Network (PSTN)
Regional Bell Operating Company (RBOC)
Release Complete Message (RLC)
Release Message (REL)
Service Switching Point (SSP)
Signaling Link Selection code (SLC)
Signaling System 7 (SS7)
Signaling Point (SP)
Signaling Transfer Point (STP)
Structured Query Language (SQL)
Subsystem Number (SSN)
Transaction Capabilities Applications Part (TCAP)
Wide Area Network (WAN)

BACKGROUND ART

Recent legislative and regulatory changes have created a more open service provider environment in the telecommunications industry. In this new environment, more and more companies are offering local exchange services as competitive local exchange carriers (CLECs), that is to say, entering the local market in direct competition with the Regional Bell Operating Company (RBOC) or independent company serving as the incumbent local exchange carrier (LEC). The LECs also face competition in a number of other forms. For example, many wireless services compete with the LEC, at least to some extent. Also, many large corporations operate their own private networks, which siphons off business traffic that otherwise would pass through a LEC's network.

A CLEC, for example, may lease certain unbundled elements of the LEC's network at reduced rates for resale. The CLEC may lease an unbundled port on an end office switch, as a point of access to the LEC's switch and the subscriber loops. The CLEC then connects its own switch network to the unbundled port. Alternatively, the CLEC may operate its own independent switching facilities and loop plant. In either case, the regulatory requirements mandate that the CLEC facilities must be integrated into the public switching telephone network (PSTN) in a seamless manner from the customer's perspective. As such, the customers must be able to make and receive telephone calls using existing dialing patterns, without any apparent distinction in processing as a result of service through the CLEC. The regulatory environment therefore places certain burdens on the incumbent LEC, to provide an efficient interconnection to the CLEC's facilities and to provide mechanisms for compensation between the parties for calls interconnected between the two carriers' networks.

A cellular service provider typically operates a number of switching offices referred to as mobile switching centers (MSCs). The MSCs connect to offices of the LEC network, for local services. The MSCs also connect to a point of presence of an IXC, for long distance and international services. Each MSC connects to a number of base stations. The base stations provide two-way radio communications with wireless stations of the customers. Today, most of the wireless stations are mobile stations, however, a number of cellular service providers are now offering wireless service to fixed locations. A transceiver at the fixed location provides the wireless communications with one of the base stations and provides an on-premises interface to the customer's telephone wiring. To the customer's telephone equipment, the interface often appears like a normal telephone line from the LEC. This fixed location service is sometimes identified as a "wireless loop" or "wireless drop" service.

Many large businesses operate private networks. In such a case, the business entity owns and operates one or more private branch exchanges (PBX). These exchanges may connect to offices of a LEC or CLEC, but only for local off-net traffic. The business usually contracts with an interexchange carrier (IXC), both for trunk circuits between the business' private exchanges and for long distance and international telecommunications services. The private exchanges connect directly to the IXC's equipment and bypass the local carriers.

Interconnect Traffic is generally defined as any calls which are routed and "handed-off" from one carrier to another. This may take the form of Independent, Interexchange Carrier, or Cellular service providers directing traffic to or receiving traffic from a local switch of the LEC. Typically, the LEC must provide tandem capacity and trunking to one or more exchanges of any of these other carriers, to carry the interconnect traffic between the carriers' networks.

Providing this capacity to the other carriers places certain burdens on the LEC. The other carriers, however, actually use this capacity in no small part to take business away from the LEC. The CLEC is a direct competitor, who attempts to design his business plan to take as much premium traffic as possible from the LEC. The cellular providers' wireless loop services also are a form of direct competition. In addition, the sale of many mobile services helps to depress sales of a number of services by the LEC, such as second line services. Finally, the bypass of the LEC by the IXC in cooperation with private networks places the IXC in competition with the LEC for interconnection to the private networks. The interconnection traffic, particularly to large businesses, often is one of the most profitable classes of local telephone service.

For revenue prediction purposes and for purposes of regulatory proceedings, the incumbent LEC tries to determine the erosion of its customer base by the business practices of its competitors. At present, the incumbent LEC has no way to determine the total market "actuals" of the customer base of any of the other potentially competing carriers. The LEC also has no way to track or forecast market gains by the other carriers. Incumbent local service providers today are in an unfortunate position where they are unable to effectively determine the magnitude of their own losses to these various forms of competition.

A number of techniques have been developed for monitoring operations of the public switching telephone network. While these prior techniques may be effective for some purposes, they have not proven effective for analyzing a competitor's traffic. To complete the understanding of the background of the invention, it may be helpful to briefly consider some of the prior techniques for network monitoring.

U.S. Pat. No. 5,475,732 Pester describes an SS7 Network Preventative Maintenance System for detecting potential SS7 and switched network troubles, automatically analyzing the troubles, and providing alarm and corrective action to avoid major network events. The Pester SS7 Real Time Monitor System described in that Patent is a multi-stage SS7 network preventative maintenance tool that traps SS7 messages, detects potential SS7 and switched network troubles, automatically analyzes those troubles, and provides alarm and corrective action instructions to maintenance personnel.

U.S. Pat. No. 5,592,530 to Brockman et al. relates to an SS7 monitoring system for evaluating the operations of telephone switches by capturing data between signaling nodes of a telephone switching system. The Brockman et al. surveillance equipment captures signaling information from different signaling network paths within a mated pair of signaling transfer points (STPs) pair and correlates the fragmented messages for each monitored call. The system is capable of generating call detail records from the SS7 messages of a mated pair cluster, for use in billing and fraud detection.

While the above discussed Pester and Brockman et al. Patents describe the usefulness of monitoring an SS7 common channel interoffice signaling network for event detection, neither of these patents is directed to the particular problems of traffic measurement addressed by the present invention. The Pester Patent places emphasis on monitoring of the SS7 network itself in order to detect troubles in its functioning. The Brockman et al. Patent focuses on monitoring of all links to the STPs in a pair and the assembly of related SS7 signaling messages to form a record of call completions.

While these methodologies may be effective for their stated purposes there remains a distinct need for an efficient and effective tool for monitoring and analyzing competitors' traffic, for example, as it passes between the LEC's network and the networks of the different carriers. Attempts to use other more traditional approaches, such as the accumulation of data from the switches themselves and the Engineering and Administrative Data Acquisition System fell short of providing the desired information.

For example, today, a LEC might attempt to measure bypass traffic by counting the number of customer orders for disconnection from the LEC's network. These orders, termed "disconnects," provide information as to lost customers. However, the disconnect data does not specifically identify what alternate carrier if any that the disconnected customers selected.

A need exists for an effective technique to measure traffic passing between two potentially competing networks, particularly between a network of a LEC and a network operated by another, potentially competing, carrier. More specific needs call for a technique to measure such traffic so as identify the size of the other carrier's customer base and to analyze patterns of the other carrier's traffic.

It is accordingly an object of this invention to provide a relatively low cost solution to the problems outlined above.

It is another object of the invention to provide a timely, powerful, cost effective means of analyzing traffic on one carrier's Public Switched Telephone Network (PSTN), to accurately analyze traffic of another carrier's network. This information can provide valuable inputs to company forecasting and network capacity management systems.

It is an object of one aspect of the invention to provide a traffic analysis tool to enable a carrier to process data regarding traffic through the carrier's network to estimate the customer base of another carrier.

It is a further object of another aspect of the invention to provide a traffic analysis tool to enable a carrier to process data regarding traffic through the carrier's network to distinguish different types of service provided to customers within another carrier's network.

DISCLOSURE OF THE INVENTION

To meet the above stated needs and objectives, the invention provides effective techniques for tracking traffic through a telecommunication network in such a manner as to enable one carrier to analyze a competitor's traffic, particularly to the extent that the traffic passes through the one carrier's network. Aspects of the invention encompass both methods and systems for accumulating the necessary call data from monitoring of the network and analysis of the call data with regard to the competitor's traffic.

The call records are developed from monitoring or compiling of items of information from certain management data messages used by one or both of the carriers' networks. Management data here refers to information generated by the telecommunication network for its operations purposes, for example, interoffice signaling messages generated to control call set-up and tear-down. Another example of such data would be messages sent from central offices of the network to an accounting office, for record keeping and billing purposes.

Thus, a first aspect of the invention relates to methods of analyzing records of interconnect traffic to identify customers of a competing carrier. Such methods involve capturing management data messages communicated by a first carrier's telecommunication network during processing of calls associated with a second carrier's telecommunication network, over a predefined study period. During the study, a record of each of a number of calls interconnected between the two carriers networks are compiled from the captured messages. The methods also involve compiling a list of addresses of customers of the second carrier's network, from the records of the calls.

Another aspect of the invention relates to distinguishing different types of services offered through the second carrier's network. This method invention involves processing the call detail records, to derive aggregate traffic data for calls to or from network identifiers associated with customers of the competing carrier. The aggregate traffic data is analyzed to form a list of network identifiers having aggregate traffic exhibiting a pattern associated with a particular type of service.

This aspect of the invention encompasses recognizing a variety of different patterns, for example relating to a high number of incoming calls, with little or no outgoing traffic. This pattern corresponds to hunt groups used by Internet Service Providers (ISPs) and to voice hunt groups. The patterns for these two services may be distinguished, however, because an ISP hunt group exhibits a long average hold time, whereas the voice hunt group exhibits a relatively low average hold time.

The invention also enables reciprocal compensation billing assurance. This advanced analysis of usage characteristics of a CLEC will help reveal possible access fraud going on between an incumbent LEC and a CLEC. Local interconnection agreements between an incumbent LEC and CLEC specify different billing rates for "local" and "access" calls. The interstate or access terminating usage rates are typically significantly greater than local usage rates, as defined in the reciprocal compensation billing arrangements between the carriers. Measurements of the CPN (Calling Party Number) contained in the call detail records can be used as a reliable method to validate the jurisdictional nature of interconnect traffic. It is important to note that CPN values ordinarily are provided on all calls in digital SS7 switching systems, with the exception of PBXs served with analog trunking. CPN can however be surpressed for an individual line (as a paid for privacy feature), for a trunk group level, and for an entire switch. CPN is not normally blocked because such blocking violates interconnect agreements to provide the data for billing validation and impacts the operation of Calling Line Identification customer services and E911. Unfortunately, many CLEC's consistently provide a very low percentage of CPN on their interconnect traffic. As a result, incumbent LECs are in many cases forced to "trust" that the traffic is local on their monthly billing statements without CPN to effectively validate.

In accord with the invention, measurement and analysis of CPN data from CLECs provides an indication of the assurance level of the distinctions between local and access calls reported for reciprocal compensation billing purposes. Using the calling characteristics on the interconnect traffic, a profile of the CLEC, its customer base, and traffic type can be built. For example, through thresholding and exception analysis, an incumbent LEC can identify a traffic pattern that points to call volumes that did not originate in the CLEC's switch. For example, very high originating local usage volumes may not be feasible from a switch with a defined number of access lines. If this usage has no corresponding CPN to validate the local nature of the calls, it suggests that some portion of the calls were not originated in that local switch. This tandem routed traffic may itself violate local interconnect agreements and more importantly, could reveal access traffic that should be routed through the incumbent LECs access tandem switch.

In an actual public network, all calls between two carriers' networks are interoffice calls. The preferred embodiments of the present invention utilize real time monitors on selected common channel interoffice signaling links to collect messages relating to set-up and tear-down of interconnect calls. A site processor compiles data from the interoffice signaling messages relating to individual calls, to form call detail records (CDRs) for interconnect call attempts. The site processor uploads the CDRs to a central server. The server maintains a relational database for the CDRs derived from the signaling data.

Data from the relational database is processed or 'prepared' and uploaded to a multi-dimensional database. The data preparation includes supplementing the records with reference data and, where necessary, spreading or "binning" usage data to multiple tracking intervals. The multi-dimensional database provides on-line analytical processing tools for enhanced processing of the call data and offers an efficient graphical user interface. The user interface may be a client-server interface, but preferably the multi-dimensional database provides a web suite type interface.

Applications running in the multi-dimensional database enable analysis and presentation of study results. Such applications might include an application to derive an up-to-date list of the network identifiers associated with customers of the competing carrier. Repeated execution of the collection and application over subsequent study periods allows the carrier to determine changes in the competing carrier's customer base. For example, if the competing carrier provides local landline telephone services, the application would provide an estimate of the number of telephone subscribers, the number of subscribers added by the competitor since the previous study and the number of subscribers lost since the previous study. Another application might distinguish the different types of services, e.g. by identifying different hunt groups and estimating the number of lines in each identified hunt group. Knowledge of the number of customers together with an estimate of the number of lines in multi-line groups such as hunt groups provides an estimate of the overall number of lines provided to customers by the competing carrier.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict the present invention by way of example, not by way of limitations. In the figures, like reference numerals refer to the same or similar elements.

DETAILED DESCRIPTION OF THE PREFERRED EMBODIMENTS

Figure 1:
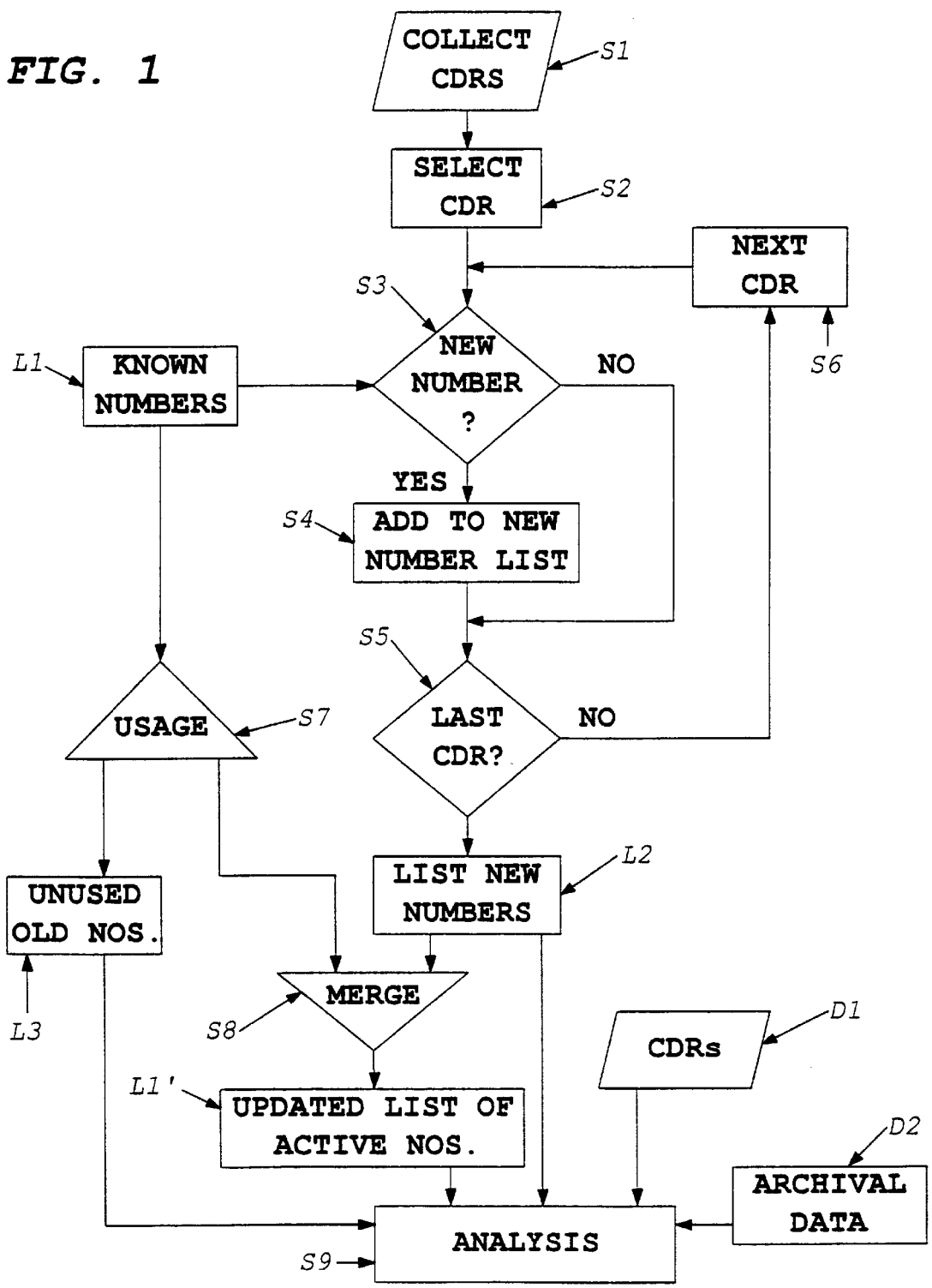
FIG. 1 is a simplified process flow chart helpful in understanding the interconnect traffic analysis to estimate levels of a competitor's business, in accord with the present invention.

The present invention involves compiling call records from management data of a telecommunication network. Management data here refers to information generated by the telecommunication network for its operations purposes, for example, messages sent from central offices of the network to an accounting office, for record keeping and billing purposes. The preferred embodiments for analysis of interconnect traffic between carriers compiles the detailed call records from interoffice signaling messages generated to control call set-up and tear-down. From the detailed call records, the invention provides tools to analyze the interconnect traffic and provide estimates regarding a competing carrier's business.

Generally, calls routed and "handed-off" from one carrier to another make up interconnect traffic. This may take the form of Independent, Interexchange Carrier, or Cellular service providers directing traffic or receiving traffic from a local exchange carrier's switch. The inventive analysis covers virtually any interconnect traffic crossing the interface between two carriers' networks, for the purpose of monitoring and analysis of the bypass, competitive access line growth and related competitive services.

Specifically, the present invention involves analysis of the detailed records of interconnect calls, to allow one exchange carrier or network service provider to estimate relevant statistics regarding aspects of another carrier's competing business. One particular analysis of the call detail records allows the one carrier to identify network addresses, e.g. the telephone numbers, of the other carrier's customers. The total number of addresses of the other carrier provides an indication of the size of the other carrier's customer base. Changes in the active customer addresses indicate losses or gains by the other carrier.

It is also possible to analyze the detailed records of interconnect calls, to distinguish between different types of traffic or service offered by the potentially competing carrier. For example, often a business utilizes one number for incoming calls to a hunt group. It is possible to identify hunt groups from analysis of the volume of incoming traffic to specific numbers. One particularly useful application of this technique identifies lead telephone numbers for hunt groups utilized by Internet Service Providers (ISPs). Having identified the lead telephone numbers of the hunt groups, it is possible to estimate the number of lines within each of the hunt groups based on cumulative usage data from the detailed records.

The traffic tracking techniques of the present invention may provide either carrier a view of the traffic across the interface. For example, an IXC, a CLEC or a cellular service provider could monitor signaling and compile the detailed call records for analysis of a LEC's traffic. For purposes of further discussion, however, assume that the LEC chooses to implement the traffic tracking system.

In the context of a landline competitor, the competitor analysis methodology identifies the number of access lines served by a CLEC connected to the LEC network. In general, CLEC access lines are identified using the following process:

a) Call Detail Records of interconnect traffic for a given period are captured.

b) A data processing application captures CLEC numbers from the CDRs, including
   (1) CLEC Calling Numbers for CLEC originating calls; and
   (2) CLEC Called Numbers for LEC originating calls.

c) A cumulative list of numbers is kept for each CLEC studied.

d) The application also finds hunt groups, particularly ISP hunt groups.

e) The application implements a model to convert hunt group usage information to an estimate of the number of members in the hunt group. Hunt groups over a given size are assumed to use DS1 service.

f) Measurements of CLEC traffic preferably are taken monthly. New access line numbers appearing in the traffic are assumed to be gain. If numbers did not appear in the data for the latest month, they are considered as loss.

Almost all numbers in a CLEC network will either receive or generate at least one interconnect call in the measurement period. The CDR data from monitoring interconnect traffic therefore will include at least one CDR for virtually every number used by the CLEC's customers. The percent of customer stations that will not make or receive such calls during the given period is small, can be estimated, and is reasonably stable. The DS1 and higher rate access lines can be distinguished from lower rate lines (e.g. DS0 lines) through analysis of call characteristics, such as peak hour connect time.

FIG. 1 shows one embodiment of a high-level process flow involved in analysis of competitive traffic conditions, in accord with the invention. The carrier seeking to analyze a competitor's traffic, such as an incumbent LEC, deploys a monitoring and data processing system, as discussed in more detail later. Using this system, at step S1 the carrier collects call detail records (CDRs), relating to all interconnect traffic between the LEC's network and the competing carrier's network for some predefined study period. The LEC can actually obtain the CDR data from monitoring of operations of its own network.

For each call interconnected between the two carriers' networks, the CDRs provide considerable information. The CDR information preferably includes at least the calling party telephone number and called party telephone number, the time of the call, whether or not completed, and the duration of the call if completed. For each call, one of the two numbers represents a number serviced through the competing carrier's network. In accord with one aspect of the invention, the CDRs are processed to accumulate numbers used by the competing carrier's customers, as an indication of the size of that carrier's active customer base.

In the process of FIG. 1, the competing carrier's customer number from each CDR is analyzed and compared to a list L1 of known numbers associated with the competing carrier. Typically, the list L1 is compiled and maintained through earlier operations of the process of FIG. 1.

The second step of the process (S2) is selection of a first CDR for processing. The selected CDR provides a number (calling party or called party) of a customer served by the competing carrier's network. The process next involves checking the list L1 to determine if the number from the selected CDR is a new number (S3) or if it is already in the list. If the number is new, processing in step S3 branches to step S4, in which the number from the selected CDR is added to a list of new numbers. At S3, if the number is in the list L1, processing branches to step S5, essentially skipping over step S4.

In step S5, the processing branches based on whether the currently selected CDR is the last CDR in the data collected for the current study. If not, processing branches to step S6 for selection of the next CDR from the study data. After selection of the next CDR, processing continues again with step S3 to determine whether or not the competing carrier's number in the next CDR is new and if so add that number to the list of new numbers (S4). Essentially, steps S3 to S6 form a loop that sequentially processes all of the CDRs collected in step S1 for purposes of the current study. When the process loop completes processing of the last CDR, step S5 recognizes this condition, and at this point, the list L2 of new numbers is complete for the current study.

The process of FIG. 1 also involves analysis with regard to activity related to known numbers already contained in the competing carrier's list L1. Thus, in step S7, the process sorts the previously known list of numbers L1 based on usage. Specifically, this step involves analysis of the usage data in the CDRs collected in step S1, to cull out a list L3 of old numbers not used during the current study period.

Those numbers from the list L1 having some usage activity in the current study period are supplied to a merge operation (S8), which merges those numbers with the new numbers in the list L2 to form an updated list L1' of known active numbers. The various lists L1', L2, L3 are available for statistical analysis (S9). The updated list L1', for example, provides an indication of the competing carrier's customer base during the study period. The list of new numbers L2 is an indication of customer gain, whereas the list of unused numbers L3 may represent customers taken out of service with the competing carrier.

The analysis (S9) preferably entails analysis of usage data and traffic patterns. Analysis of usage and traffic patterns for the current period utilizes the newly collected CDRs (D1). The analysis may compare results from those CDRs and/or the current lists to archived information (D2), to show incremental changes and long term trends apparent from the interconnect traffic.

The analysis can provide a relatively high level overview, such as the size of and changes in the customer base indicated by the telephone number lists and the levels of interconnect usage. In the preferred embodiments, the monitoring system collects the CDRs from interoffice signaling messages, and the resulting CDRs contain considerable additional information. The analytical processing of such CDRs enable the LEC or other carrier conducting the study to identify traffic patterns, and in some cases at least, to distinguish different types and levels of service provided by the other carrier from the traffic patterns.

One class of distinction of particular interest relates to commercial customers utilizing multiple line services, such as hunt groups. Many businesses utilize one number for all incoming calls to the lead number of a group of lines, referred to as a hunt group. ISPs, in particular, utilize hunt groups for all of their Internet access traffic. The hunt groups of ISPs exhibit no outgoing traffic. The different types of customer, business as opposed to residential or even ISP as opposed to other businesses, have different forecasts for impact on the carrier's network and projected revenues. Using the inventive analysis, the carrier effectively can project the amount of revenue that might have been generated had the business traffic remained on the carrier's network, the limited revenue produced by the interconnect traffic, and thus the loss caused by migration of the business traffic to the competing carrier.

The discrimination between different types of services or customers involves compiling and analyzing call traffic data, to recognize patterns of calls to and/or from certain types of users. In particular, this involves searching for patterns of calls to a certain, limited number of destination telephone numbers and identifying the numbers based upon recognition of the appropriate calling pattern. Depending on the type of user, the pattern may vary. For an ISP, for example, the calling pattern involves a high volume of incoming calls and a long average hold time. If the pattern is consistent with ISP access, there will be no outgoing traffic from a number assigned to an ISP. Other businesses may exhibit high volumes of both incoming and outgoing calls. If the call traffic is predominantly voice traffic, the average hold times will be relatively short.

Figure 2:
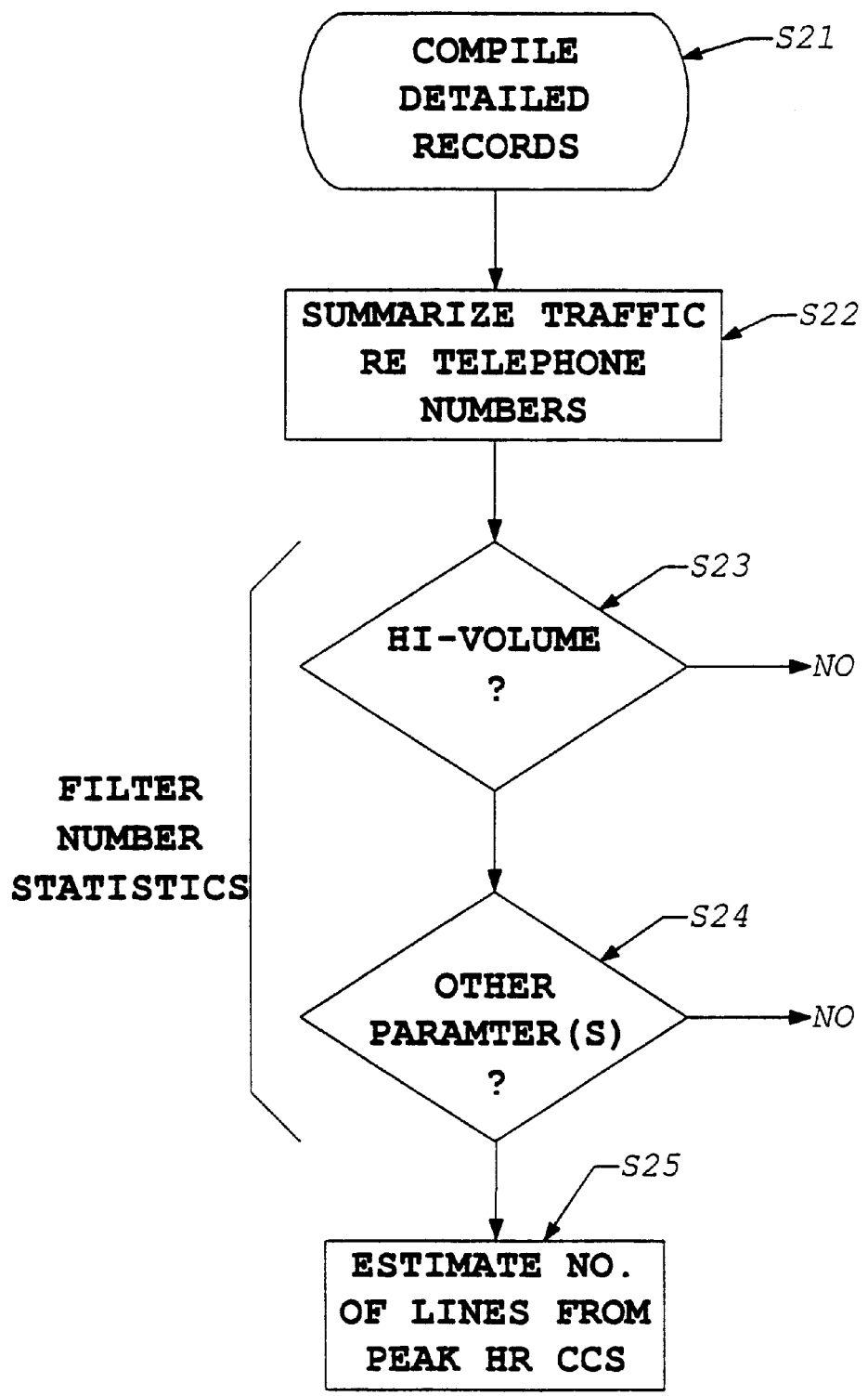
FIG. 2 is a simplified process flow chart providing a general illustration of a process enabling one carrier to analyze and distinguish certain types of service provided by another carrier, in accord with an embodiment of the invention.

FIG. 2 depicts the high-level process flow of a method for distinguishing different types of subscriber telephone service numbers within the competing carrier's network, for example to distinguish hunt group numbers from residential telephone numbers. Again, the process relies on a system for monitoring certain management data messages used by the network. This system compiles detailed records in the form of CDRs for interconnect calls carried across the interface between the two carriers' networks (S21). The CDRs may relate to all calls interconnected between the networks, to calls connected from the carrier's network and terminating into the competing carrier's network, or to calls connected from the competing carrier's network for termination in the carrier's own network.

The detailed call records are processed to create relevant summary information characterizing the call traffic through the selected portion of the network (S22). For example, at this point, the summary data will indicate the number of calls to each destination number as well as the time and duration for each call interconnected between the two networks.

The routine then executes a series of steps to filter the information based on call statistics relative to the users' telephone numbers. This filtering progressively narrows down the set of numbers under consideration until a collection or subset of numbers is developed, where all the numbers collected in the remaining subset exhibit traffic statistics satisfying all of the filter criteria. The carrier's technician selects the filter criteria for a particular study in order to cull out numbers corresponding to a particular traffic pattern associated with a particular type of customer or a particular type of service that the competing carrier might offer.

The filtering often utilizes one of several different measures of usage, such as minutes of use (MOU), centi-call seconds (CCS) or peg count. CCS is a measure of connect time similar to MOU but based on units of one hundred seconds of call duration. Peg count is the number of calls.

In one example, to distinguish hunt group numbers from numbers for residential or other services, the routine would first filter the numbers based on volume of incoming call traffic. The lead number of a hunt group typically will have a large number of incoming calls (peg count) directed to that number. In step S23, the routine filters the data associated with destination telephone numbers in the competing carrier's network based on the volume or number (peg count) of incoming calls counted in the study period. This filter operation may select some arbitrary number of destinations having the highest incoming call volumes, e.g. the top fifteen. Preferably, the processing in step S23 identifies all numbers associated with a volume of incoming calls meeting or exceeding a threshold. If the intent is to ultimately identify hunt group numbers, data relating to destination numbers having a relatively low volume of incoming calls (typically residential or small business) may be discarded.

From the numbers identified in step S23, the process may now execute one or more additional filtering steps (S24) with respect to other parameters corresponding to the pattern for the type of service or customer of interest. The routine analyzes aggregate traffic data for the telephone numbers collected after all of the filter operations (S25). Of particular interest, this analysis can determine the number of lines associated with a particular telephone number.

The number of lines or DS0 channels can be determined by analysis of the traffic carried during any period in which a hunt group is overflowing, as indicated by numbers of uncompleted calls caused by user busy conditions. If the maximum capacity were not reached during the study period, the busiest hour would be the best choice. Some general assumptions might be reasonable. For example, it might be assumed that ISP hunt groups will be busiest during the "ISP busy hour." In contrast, it might be assumed that Voice/PBX Trunk hunt groups will be busiest during the "Voice Busy Hour", i.e. that hour in which non-ISP traffic is busiest.

For hunt group lines, the lead number used on incoming call is associated with calls ultimately terminated on more than one line in the group. A normal telephone line can only support so much usage per hour or other unit of time, whereas a group of lines can support a higher average amount of connect time per hour. Thus, to identify multi-line hunt groups, the routine accumulates data regarding usage within each hour. The filter parameter could relate to average usage over the time period, but preferably the filter parameter in step S24 relates to peak hour connect time. In step S24, peak hourly connect times in CCS, for the numbers remaining after step S23, are compared to a threshold value. Again, data relating to telephone numbers not satisfying the criteria, i.e. having a relatively low peak hourly connect time, may be discarded.

At this point, the first two filter steps (S23, S24) have culled the data down to identify a list of those numbers satisfying the criteria for high volume and high peak hourly connect times. Depending on the level of accuracy desired, this list of candidate numbers may actually be sufficient. However, the procedure may go through another filter operation, related to other criteria.

The statistical filtering produces a list numbers satisfying the filter criteria. However, the collected CDRs for the traffic relating to those numbers collected for the study are available for further analysis. One analysis operation of particular interest involves estimation of the number of lines in each group (S25). For example, if connected time is measured as Centi-Call Seconds (CCS), the threshold for recognizing a multi-line group might be 36 CCS in the peak hour. For estimating the number of lines in the group, the processing routine would divide the CCS value for the peak hour by 36. For example, for a peak hour usage of 360 CCS associated with one lead number, there must be at least 10 lines in the group, and the routine might estimate that there actually are 10–12 lines in the particular group. Groups estimated at 24 lines or higher are assumed to use DS1 service from the CLEC.

The traffic pattern analysis can distinguish a number of different types of customer access lines within the CLEC's network. Examples of line types and corresponding traffic pattern parameters include:

a) DS1 Level Access:
 1. ISP Hunt Groups: High Number of Calls, High Connect Time, Long Average Hold Time, Incoming Traffic Only
 2. Voice Hunt Groups: High Number of Calls, High Connect Time, Short Average Hold Time, Incoming Traffic Only
 3. PBX Trunks: High Number of Calls, High Connect Time, Short Average Hold Time, Incoming and Outgoing Traffic b) Below DS1 Level Access:
 1. Key System Trunks: Medium Number of Calls, High Connect Time, Short Average Hold Time, Incoming and Outgoing Traffic
 2. Business Lines: Low Number of Calls, Medium Connect Time, Short Average Hold Time, Incoming and Outgoing Traffic Individual lines preferably are identified by number and ranked or grouped according to traffic characteristics, e.g. daily minutes of use. The total quantity of individual numbers can be counted, and an average usage per day determined for each day measured.

Figure 3:
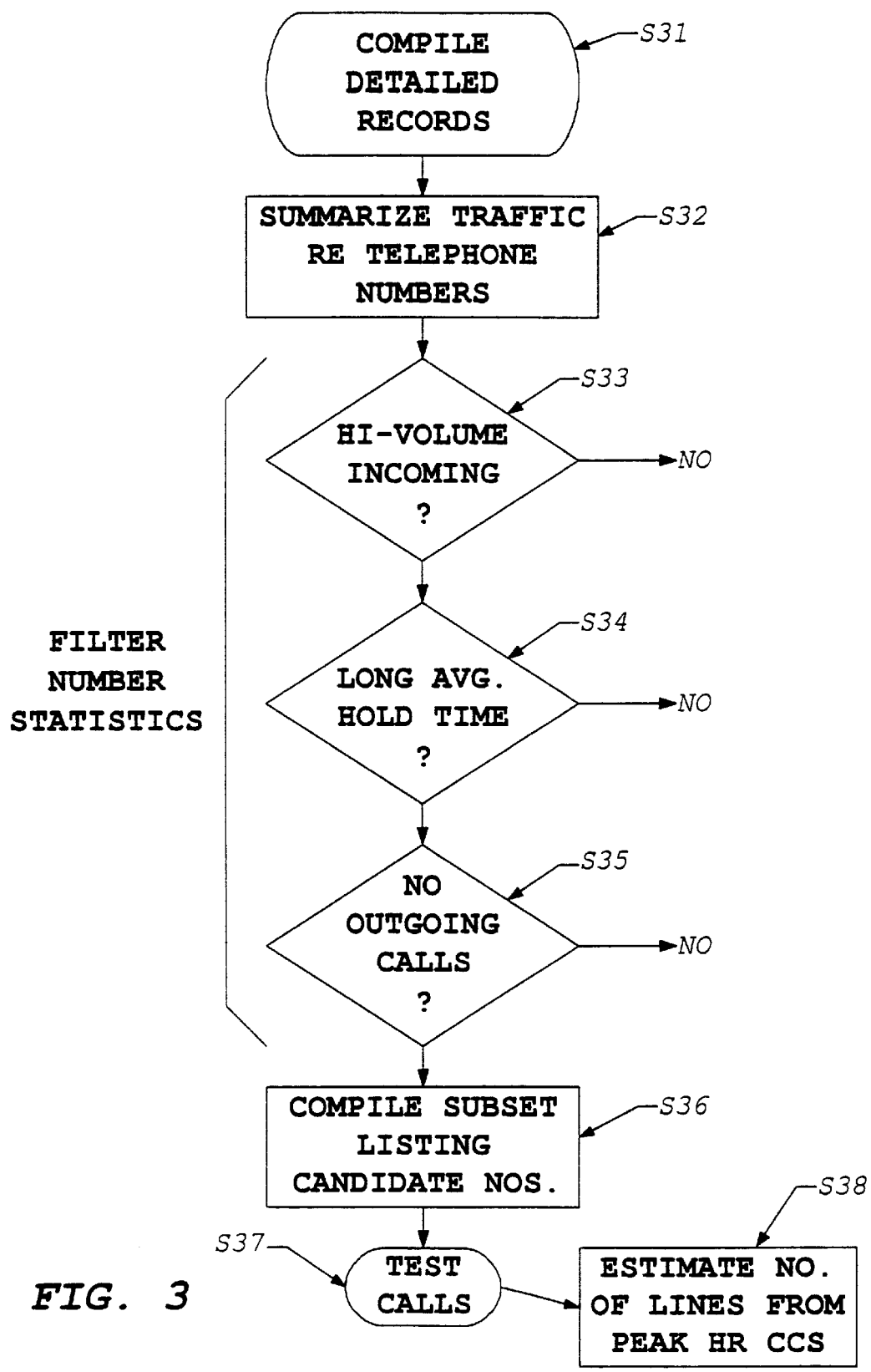
FIG. 3 is a simplified process flow chart depicting a process for identifying and analyzing a specific type of traffic through the other carrier's network, such as that to an Internet service provider.

To understand application of the analytical technique to distinguish access lines, it may be helpful to consider a specific example. One example of a specific business using multi-line hunt groups that is of particular interest is Internet access traffic. For Internet access traffic to a modem pool of an ISP, the calling pattern involves a high volume of incoming calls and a long average hold time. If the pattern is consistent with ISP access, there will be no outgoing traffic from a number assigned to an ISP hunt group. FIG. 3 depicts the high-level process flow of a method for finding telephone numbers of ISPs and estimating the number of lines that the competing carrier provides to the ISPs.

Again, the first step (S31) of the ISP finder process involves compiling data from the specific monitored messages to form detailed records (CDRs) of calls interconnected across the interface between the two carriers' networks. For an ISP finder, these CDRs at least relate to all calls attempted or completed for termination in the network of the competing carrier. The detailed call records are processed to create relevant summary information characterizing the call traffic through the selected portion of the network (S32). For example, at this point, the summary data will indicate the number of calls to each destination number as well as the time and duration for each call into the other carrier's network.

The ISP finder routine (FIG. 3) then executes a series of steps to filter the information based on call statistics relative to the users' telephone numbers, to develop a list of candidate numbers. In the ISP finder application, the filter operations collect telephone numbers for which the statistics indicate a high volume of incoming calls, long hold times and no outgoing traffic. Thus, the step S33 serves to identify destination telephone numbers within the CLEC network to which the LEC network processed a high-volume of calls. This operation may identify all numbers associated with a volume of incoming calls meeting or exceeding a threshold. Alternatively, the process may select some arbitrary number of destinations having the highest incoming call volumes, e.g. the top fifteen. Data relating to destination numbers having a relatively low volume of incoming calls is discarded.

From the numbers identified in step S33, the process now identifies those numbers for which the calls exhibited a long average hold time per call (S34). Average hold time associated with one of the numbers is calculated by dividing the total connect time (CCS or MOU) for calls to or from the telephone number by the total number of calls for that number. The total calls may be the count of all calls initiated or the count of all calls completed for that destination number. Again, Data relating to telephone numbers not satisfying the criteria, i.e. having relatively low average hold times, is discarded.

At this point, the first two filter steps (S33, S34) have culled the data down to identify a list of those numbers satisfying the criteria for high volume and long average hold times. Depending on the level of accuracy desired, this list of candidate numbers may actually be sufficient. However, the procedure may go through another filter operation to determine whether or not there were any outgoing calls associated with each number (S35). This operation deletes numbers for which there were outgoing calls from associated stations in some way processed through the LEC network. The result at this point (S36) is a small subset listing of the destination numbers in the competitor's network found to satisfy all of the filter criteria, i.e. high volume, long average hold time, and no outgoing traffic.

At this point, the list may be compared to a list of known ISP numbers served through the competing carrier's network. From this comparison, the routine would develop a list of new ISP candidate numbers (S36), and the new numbers may be used to update the list of known numbers. If further confirmation that any of the numbers are those of ISPs is desired, for example to confirm that new numbers are those of ISPs before updating the list of known numbers, a carrier technician can make telephone calls to the candidate numbers (S37). If the technician hears a modem answer tone, then the telephone number points to a data device of the type that might be operated by an ISP. Actual tests of the procedure shown in FIG. 3 have produced candidate number lists at S36 that identified ISPs to an accuracy of 95% or better when tested by follow-up calls (S37).

To this point, the process of FIG. 3 identifies the lead telephone numbers of ISPs operating through the competing carrier's network. Again, the CDRs are available for further processing. Here, the CDRs relate to the interconnect traffic to the identified ISP numbers. Based on the connect time identified in the CDRs, it is then possible to estimate the number of lines within each of the ISPs' hunt groups (S38). Specifically, the routine of FIG. 3 estimates the number of lines in each group from the CCS during the peak busy hour associated with each ISP lead number.

The study of competitors in accord with the techniques exemplified by FIGS. 1 to 3 preferably will provide regular reports at pre-established intervals. These reports provide much needed "bypass actuals," which can then be used to establish a "current" total base of the competitors' lines. Ultimately all major CLECs, cellular systems, Personal Communication Service (PCS) systems and cable based telephone networks should be periodically studied. As a time series is developed for each "forecasted element", trends can be determined and used as a basis for forecasting. The ideal frequency of reports is once per month; however, measurement limitations may dictate quarterly, semiannual or even annual measurements of the market.

As shown by the above discussion of FIGS. 1 to 3, the processing of the CDR data enables a carrier such as a LEC to accurately quantify another carrier's customer base, distinguish certain types of service and/or customers of the other carrier, and analyze traffic patterns of the other carrier's customers. An accurate profile of a CLEC and its customer base can be derived through the processing and analysis of interconnect CDR's. As an example, with the above-discussed system programs, an incumbent LEC may produce the following characteristics of a particular CLEC switch: Calling Party Number percentages, Originating and Terminating point code and usage distributions, Percent Data calling originating from the CLEC switch, Percent Data calling terminating to the CLEC switch, usage growth rates, and access line growth rates. These statistics can be used to highlight and detect possible access fraud conditions between the incumbent LEC and CLEC. As well, the acquired knowledge of the CLEC network can be valuable in assessing and reacting to competitive threats.

Figure 4:
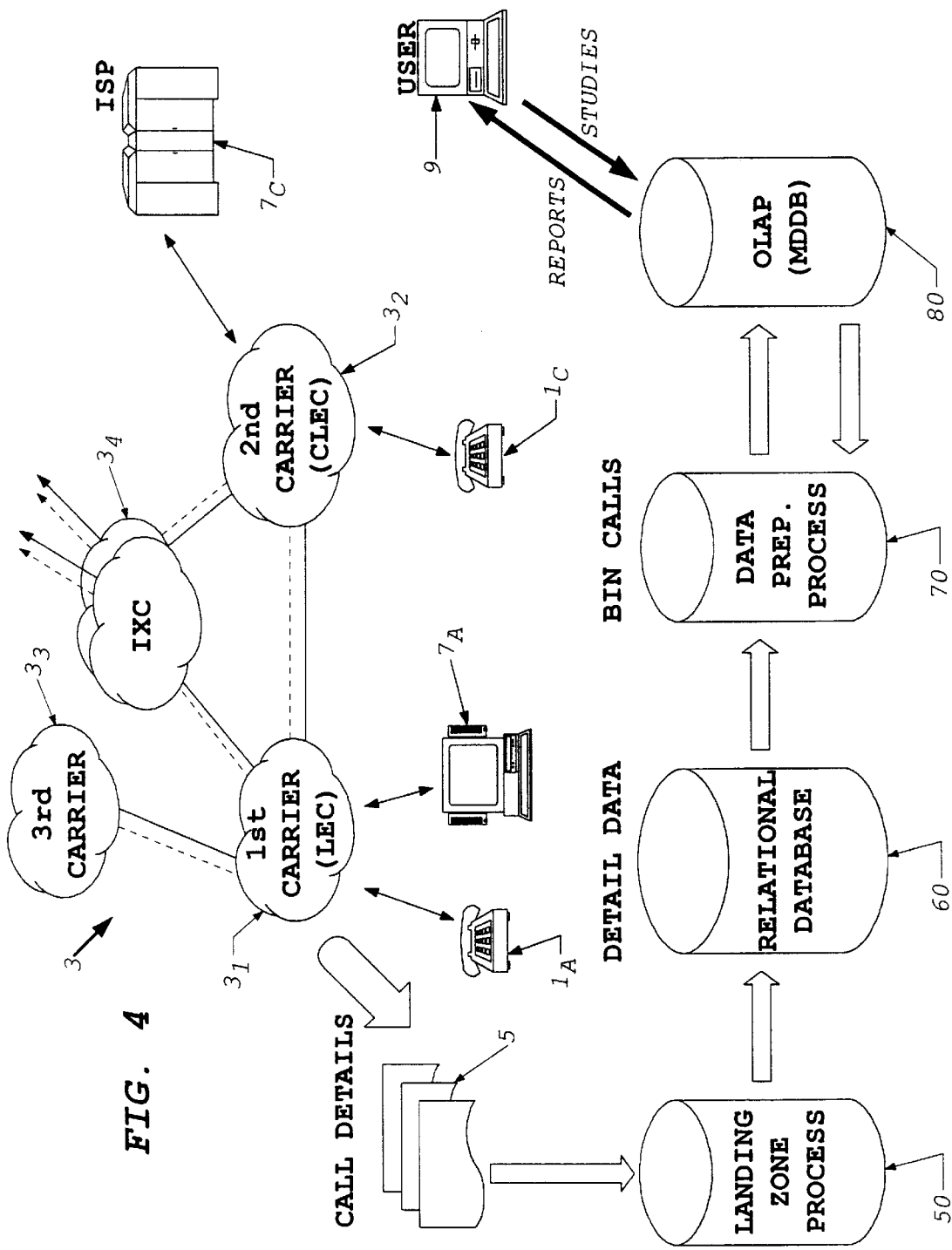
FIG. 4 is a block diagram showing the high-level functional aspects of a traffic track system for analysis of carrier interconnect traffic.

The traffic analysis utilizes monitoring of management data developed by the carrier (e.g. LEC) from signaling during processing of interconnect traffic across the interface between its own network and the network of the other carrier. FIG. 4 provides a high-level illustration of the functions involved in preferred embodiments of the traffic studies, used to analyze interconnect traffic between two carriers, in accord with various preferred aspects of the invention.

In reality, the public network that we think of as the telephone network comprises many segments operated by different carriers, including local exchange carriers (LECs) and interexchange carriers (IXCs). For purposes of this discussion, FIG. 4 illustrates three such segments or sub-networks. One sub-network is a network $3_1$, operated by a LEC. The LEC is the carrier interested in traffic analysis, for purposes of this discussion.

The second sub-network could be that of an IXC or any other carrier, but for purposes of this discussion, FIG. 4 depicts a second network or segment $3_2$ operated by a Competitive Local Exchange Carrier (CLEC). The first two networks $3_1$ and $3_2$ are interconnected by trunk links (solid line) for carrying the actual traffic and by signaling links (dotted line).

FIG. 4 depicts a third carrier's network $3_3$. The third carrier's network connects to the LEC's network $3_1$ through trunk links (solid line) for carrying the actual traffic and through signaling links (dotted line). In a typical example, the third carrier would be a cellular provider or an IXC providing bypass service to large commercial enterprises.

Typically, customers using telephones such as the telephones 1 make calls through the public switching telephone network (PSTN) 3. The PSTN provides switched connections between calling and called stations, supporting voice-grade communications between the stations. The parties may use the switched voice-grade connections for conversational speech. Today, many parties also use the telephone connections through the PSTN to communicate other information, e.g. data modulated onto carrier waves within the audio bandwidth of the telephone network 3.

The telephone calls may stay entirely within one carrier's network, for example when a party using PC $7_A$ calls the station $1_A$, both of which receive switched telephone service from the LEC network $3_1$. Some calls, however, interconnect between two carriers' networks. For example, a call from the PC $7_A$ to the ISP equipment $7_C$ would go first through the LEC network $3_1$ and then through the CLEC network $3_2$.

Some calls between two carriers' networks actually transit one or more other carriers' networks. In the illustrated example, the third carrier does not have a direct link into the CLEC's network $3_2$, and calls between the networks $3_2$ and $3_3$ must transit the LEC's network $3_1$. IXCs often have agreements with CLECs to bypass the LEC, and therefore will have direct network connections to the CLEC networks as illustrated by the IXC networks $3_4$. However, a cellular carrier or another CLEC may not have such an arrangement with the CLEC network $3_2$. In such a case, the third carrier's network $3_2$ initiates and receives calls through the landline network via the LEC network $3_1$, including calls to and from parties served through the CLEC network $3_2$. Most IXCs $3_4$ will have network connections to the LEC network $3_1$ and to all CLEC networks $3_2$ in a particular region and will provide long distance interconnection as represented by the arrows.

Set-up and tear-down of a call connection traversing two switching offices of the PSTN requires an exchange of various signaling information between the two switching offices. Similarly, set-up and tear-down of a call connection traversing two or more carriers' networks requires an exchange of various signaling information between offices communicating over interface(s) between the networks. Some systems still utilize in-band signaling, within the voice channels on the interconnecting trunks. However, increasingly, the carriers utilize an out-of-band signaling technique commonly referred to as "Common Channel Signaling" or "Common Channel Interoffice Signaling" (CCIS).

In accord with the invention, certain monitoring equipment in one carrier's network, such as the LEC network $3_1$, receives the signaling messages exchanged between that network and either or both of the other carriers' networks $3_2$ and $3_3$ and accumulates records 5 of the details of the calls. The call detail 5 for each call includes a wide variety of different items of information about the call. For example, the information may include calling and called party numbers, the time of the call, the duration of the call if completed, the type of release if terminated without completion, identification of office(s) serving the call within each network, etc. The monitoring equipment in the LEC network $3_1$ accumulates similar call detail records 5 for calls to and from telephones $1_A$, $1_C$ as well as calls to and from data devices, such as calls from the personal computer (PC) $7_A$ to an ISP $7_C$.

The call details 5 are supplied through a database input procedure 50, referred to as a "landing zone" process. The landing zone (LZ) process 50 serves to format the data and load the call details into appropriate tables in one or more relational databases 60. An example of appropriate database software is available from Oracle.

The landing zone process 50 manages the incoming CDR data streams, checking for errors and loading the data into the relational database tables. The LZ 50 buffers incoming records and periodically uploads the records into the tables. The records follow a first in, first out logic at the landing zone. If two types of call detail records are used, e.g. SS7 and AMA, the landing zone 50 may actually comprise two different LZ routines.

The relational database 60 stores the bulk detail data in an accessible form. A Multi-dimension Database system (MDDB) can be used, to enable analysis and presentation of study results. Alternatively, it is possible to use standard queries (i.e., PL/SQL) that run against the stored relational database call detail records tables, to produce files that are in turn packaged into spreadsheet reports to provide the analysis of interconnect traffic of CLECs or other carriers.

However, still further processing is preferred, to allow analysis and output of the results in desired aggregate forms. Data from the relational database 60 is prepared and uploaded in process 70 for input for On-Line Analytical Processing (OLAP) 80. The preferred embodiment of the on-line analytical processing routine comprises a multi-dimensional database (MDDB) with a presentation layer. The presentation layer may be an independent program or an integral element incorporated in a software package with the multi-dimensional database. The presentation layer provides the user interface, for example in the form of a client-server interface or a web-browser interface. The presentation layer offers the user fast and flexible access to the study data.

The data preparation process 70 summarizes details of calls and categorizes calls into logical groupings. One other function of the data preparation 70 is categorizing calls into "bins" based on the time and duration of the calls.

The data preparation process 70 also may involve modifying each call detail record by application of reference data from other sources, such as profile or service information of one of the parties to the call. In this part of the data preparation operation for studies of interconnect traffic, one specific purpose is to combine information from call detail records with external support system data. For a CLEC traffic study application, this operation might identify the end office switch in the LEC network that serves callers who originated calls to destinations served through the CLEC network. For a study of competitive loss or gain, where local numbers are portable, this process might identify numbers ported from the LEC to the CLEC and the party who previously used each ported number through the LEC network. Preferably, the enhancement of the data with reference information utilizes middleware that takes the form of a relatively universal system, with an interface to other data systems, whether it is for forecasting or for looking at marketing data, demographic data, etc.

The processed call detail information is uploaded to the OLAP 80. The OLAP process 80 runs one or more applications to analyze the prepared call details and compile data into reports, for output to a user's terminal 9. The OLAP process provides certain study management tools as well as the user interface. For example, the OLAP system 80 receives the inputs and presents outputs via the user terminal 9, to set up study models, to set-up specific studies using established models and to present study results. The preferred embodiment of the OLAP software is a multi-dimensional database (MDDB) with an integrated presentation layer.

The MDDB 80 captures and stores high level summary data and displays it through the user terminal 9 in a variety of ways. The MDDB enables the user to overlay multiple dimensions when viewing the data, for example, showing originating traffic from one area code generated during certain hours of the day with an average call holding time greater than a specified threshold. The preferred MDDB offers the manipulation of data in a cube concept, where data can be approached from many different directions, providing different slices or views of the data. The preferred MDDB also uses a "drilling down" feature to slice or roll-up (aggregate) data based on the metrics (Minutes of Use, Average Holding Time, Busy Hour identification, etc.) required. The drill-down feature enables the user to access the raw call detail information, when necessary. As one example of drill-down, having found an ISP $7_C$ served through the CLEC network $3_2$, a user might drill-down into the call details to identify originating offices within the LEC network $3_1$ for calls to that ISP or even telephone numbers of subscribers calling that ISP. Such a drill-down analysis might enable the LEC engineer to design and deploy new network equipment to relieve congestion caused by such Internet access traffic. The drill-down feature also would enable the LEC to identify its own customers that are accessing the particular ISP served by the CLEC.

The application running on the MDDB may also provide another point at which the user may access external reference data. For example, having found candidate numbers for ISPs, the application may compare the numbers to those of known ISPs, and reduce the list to a list of new ISP numbers within the CLEC's domain.

The MDDB allows export of data, e.g. to copy a particular presentation from the MDDB into a spreadsheet such as into Excel. The user can then do his own analysis in Excel.

At a higher level, the MDDB enables presentation of aggregate traffic pattern data. For example, it is possible to display Internet access traffic as a percentage of all traffic to a particular CLEC, either based on peg count or usage (e.g. MOU or CCS).

Multi-dimensional database software providing these capabilities is available from Gentia Software, Inc. of Wakefield, Mass. under the product name of Gentia DB. The Gentia DB is a fully OLAP-compliant multidimensional database. Similar to Essbase, it is loaded with data derived from various company data sources, and is pre-consolidated. Gentia supports an "unlimited" number of dimensions, as well as multiple hierarchies within a dimension. It is a fully object oriented visual development environment, with a library of predefined objects, and provides an OLAP database with tools for loading, analysis, querying, and reporting.

Gentia runs on multiple platforms and is scalable across a large system. The multi-dimensional database program could run on a server, and the relational database 60 might run on a separate server. Alternatively, two or more of these databases may run within one computer system or server. The server running the multi-dimensional database (MDDB) 80 is accessed by multiple user work stations 9. Although the system may implement a client-server interface, preferably, the database 80 provides a web suite for a user interface, enabling access using standard browser software in the workstations. The actual server may connect directly to the terminals 9 or communicate therewith through a data network, such as a private LAN or WAN or the Internet.

Logically, the data preparation software 70 runs as a separate (e.g. Oracle) relational database. The MDDB is platform independent and may run in the same server as the relational database or in a separate server. The data preparation software accesses records from each relational database and uploads data to the MDDB. The MDDB processes data from those records to generate the analytical tables, reports and graphs.

The web suite software together with the MDDB software performs all necessary OLAP processing. As part of this function, the software implements a Data Collection and Study Management Tool set, which enables the user to set up and control studies using the traffic track system and run applications to obtain the analytical results. A more detailed description of the MDDB operations and this Tool set appears in commonly assigned copending application Ser. No. 09/188,712 entitled "TRAFFIC TRACK USAGE MEASUREMENT SYSTEM" filed Nov. 10, 1998, and that description is incorporated herein by reference.

The present inventions provide effective monitoring of various systems and carriers' portions of a public telephone network and processing of the data derived from such monitoring, to enable analysis of various patterns of the traffic across the interface between carriers' networks. The monitoring and analysis may utilize automatically generated accounting (AMA) messages. In the preferred embodiments, the monitoring involves capture of interoffice signaling messages relating to interoffice telephone calls interconnected between the two carriers' networks.

In virtually all interconnect traffic, every call made is an interoffice call. For example, one hundred percent of LEC/CLEC calls may be tracked by monitoring the interoffice signaling. Typically, interconnect traffic to the network of a cellular provider or an IXC also is interoffice traffic and may be analyzed by monitoring interoffice signaling. The interoffice signaling theoretically could be in-band signaling, but preferably, involves out-of-band signaling, i.e. some form of common channel signaling. In the preferred embodiments, the interoffice signaling takes the form of a signaling system seven (SS7) compliant common channel interoffice signaling network. The SS7 signaling extends through and between both carriers' networks.

To facilitate understanding of these preferred embodiments of the invention, it may be helpful at this point to review the structure and operation of the telephone network, in somewhat more detail.

Figure 5:
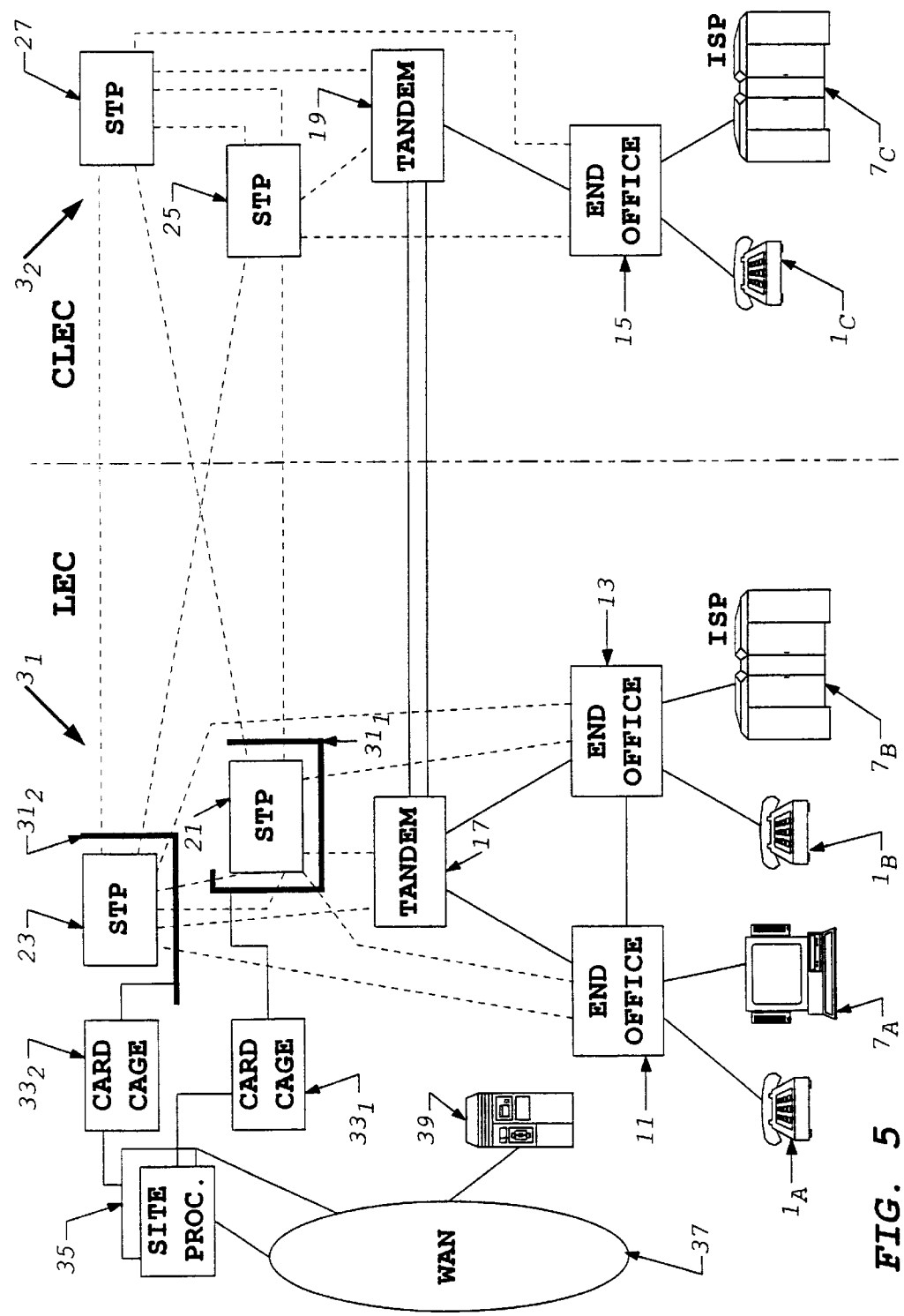
FIG. 5 is a block diagram illustrating a switched telephone network and elements used to capture and analyze call data from that network to implement traffic analysis applications in accord with the invention.

Referring to FIG. 5 there is shown a block diagram of a public switching telephone network and the SS7 network that carries the call control signaling for the switched network. The PSTN comprises networks operated by many carriers. The invention enables one carrier to monitor and analyze interconnect traffic across the interfaces between networks of different carriers, to analyze other carrier's business and thus project impact thereof on the carrier's own business. Persons skilled in the art will recognize that the traffic tracking may apply to any such interconnect traffic. For purposes of discussion of FIG. 5, it is assumed that the interconnect traffic crosses the interface between two carriers' networks, specifically between a LEC network $3_1$ and a CLEC network $3_2$.

The switched portion of telephone network consists of a series of central office (CO) switches, which are conventionally referred to as signaling points (SPs) in reference to the SS7 network or as service switching points (SSPs) in reference to an intelligent version of the PSTN. Certain of these SPs comprise end offices (EOs) illustrated at 11, 13 and 15 in the drawing. Other SPs serve as tandem offices, illustrated for example at 17 and 19 in this drawing.

Customers' telephone equipment connects through telephone lines or other links to the end offices. Examples of such equipment include normal telephone stations shown at $1_A$, $1_B$ and $1_C$ as well as various data devices such as the PC and ISP hardware shown at $7_A$, $7_B$ and $7_C$.

Each office serving as a signaling point has a point code comprising a 9-digit code assigned to every node in the signaling network. Messages communicated via the SS7 signaling network utilize the codes to identify source and destination SPs, and the traffic tracking system can use these point codes to identify messages relating to traffic through particular offices.

The end offices 11 and 12 represent end offices in the region of one operating company or LEC, whereas the end office 15 represents one of the end offices in the region of a different operating company, in this case a CLEC. Each operating company or carrier has its own network or "member" ID, which is used as the first three digits of the point codes of the SPs of that carrier's network.

Also, each end office resides within an area assigned NPA digits as an area code. Each exchange is identified by one or more three-digit codes, referred to as NXX digits. Each such code corresponds to the NXX digits of an NXX-XXXX (seven-digit) telephone number or the three digits following the three area code digits (NPA) in a ten-digit telephone number. Origination and destination telephone numbers appear in various SS7 signaling messages and various records that the offices create for billing and the like. As a result, the NPA-NXX digits of those telephone numbers also can serve as identifiers of the serving end offices.

Digital trunk circuits, shown as solid lines, interconnect the switching offices of each network 3. Typically, within one carrier's network $3_1$ end offices, such as end offices 11 and 13, are directly interconnected by trunk circuits. For overflow traffic and/or for connections to other carrier networks, the offices 11 and 13 also connect via trunk circuits to a tandem office 17. In the CLEC network $3_2$, the end office 15 connects through a trunk circuit to a tandem 19 or directly to other end offices (not shown). The LEC and CLEC networks $3_1$, $3_2$ interconnect through trunk circuits shown for example between the tandems 17 and 19, although end office interconnections are possible.

The preferred embodiments of the present invention rely on monitoring of interoffice signaling messages. To understand the monitoring functions it may be helpful to review the interoffice signaling functions of the network.

The SS7 type interoffice signaling network comprises a series of Signal Transfer Points (STPs) shown here at 21, 23, 25 and 27 and interconnecting data links indicated by dotted lines. Each STP in a network connects to the SP or SSP capable offices in that network via A links. Thus, in the LEC network $3_1$, the end offices 11, 13 and the tandem 17 connect to the STPs 21, 23 through A links. Similarly, the end office 15 and the tandem 19, in the CLEC network $3_2$, connect to the STPs 25, 27 via A links.

Within the LEC network $3_1$, the STPs 21 and 23 constitute a mated pair of STPs connected to each other via C links.

Within the CLEC network $3_2$, the STPs 25 and 27 also constitute a mated pair connected by C links 58. Each of these mated pairs serves its respective transport area and/or carrier network. Persons skilled in the art will recognize that there may be multiple mated pairs per region or carrier, one pair for each designated transport area. Multiple STPs in a carrier's territory may be arranged in a heirarchy. Also, although the STPs appear within one local carrier's network, the CLEC may actually use STPs provided by some other carrier. For example, some CLECs contract with an IXC, such as AT&T, to provide the STP service for the CLEC's network. The STPs provided by the IXC continue to perform the packet switching functions for interoffice signaling for the IXC's own network.

The STP 21 connects to the STP 25 via a B link, and the STP 21 connects to the STP 27 via a D link. Similarly, the STP 23 connects to the STP 27 through a B link, and the STP 23 connects and to the STP 25 through another D link. As will be understood, the A, B, C and D links are physically identical links. The letter designations for these various links relate to cost in terms of ease of access.

The STPs in any mated pair have the same translations. Thus, the translations in STP 21 are the same as the translations in STP 23, and the translations in STP 25 are the same as the translations in STP 27. The translations control the message routing through the STP.

The STPs may connect to transactional database systems, such as Service Control Points, Integrated Service Control Points or the like. Such database systems, for example, provide call control information for a wide range of recently developed enhanced features. Other database systems, such as the Line Identification Database (LIDB) provide information for ancillary purposes, for example, for credit card validation, for enhanced versions of Caller ID, etc. The monitoring in accord with the traffic track invention captures messages going to and from the tandems or end offices. This includes messages exchanged between the offices and the database systems. Although possible, for our purposes, it is not necessary at this time to separately monitor the links to the database systems. Therefore, for simplicity of illustration, these databases have been omitted from FIG. 5.

The present invention preferably conducts studies of competing carriers based on interconnect traffic between the carrier conducting the study and the other carriers. These interconnect studies are based on capture and processing of the common channel interoffice signaling (CCIS) messages exchanged between offices, during otherwise normal call processing, typically implemented in the signaling system seven (SS7) protocol. For SS7, typical application layer protocols include Transaction Capability Application Part (TCAP); Operations, Maintenance, Application Part (OMAP); and ISDN User Part (ISDN-UP or ISUP). TCAP provides the signaling protocols for exchange of non-circuit related, transaction-based information, typically for accessing databases such as service control points. OMAP specifies protocols for certain specialized messages relating to maintenance and operations. Although the tracking system can capture and analyze TCAP and OMAP messages, for purposes of the presently preferred embodiments, the most relevant part is the ISDN-UP, sometimes referred to as "ISUP".

ISDN-UP specifies the procedures and message protocols for setting up and tearing down trunk connections for calls utilizing common channel interoffice signaling (CCIS). ISDN-UP messages, for example, include an Initial Address Message (IAM), an Address Complete Message (ACM) an Answer Message (ANM), a Release Message (REL), and a Release Complete Message (RLC).

The lower three layers of the SS7 protocol, the network layer, the signaling link layer and the data link layer, form the Message Transfer Part (MTP) of SS7, for the TCAP, OMAP and ISDN-UP protocols. The MTP is common to messages for all applications and provides reliable transfer of signaling messages between network nodes. The MTP relays messages between applications running at different nodes of the network, effectively like a datagram type service.

Figures 6, 7:
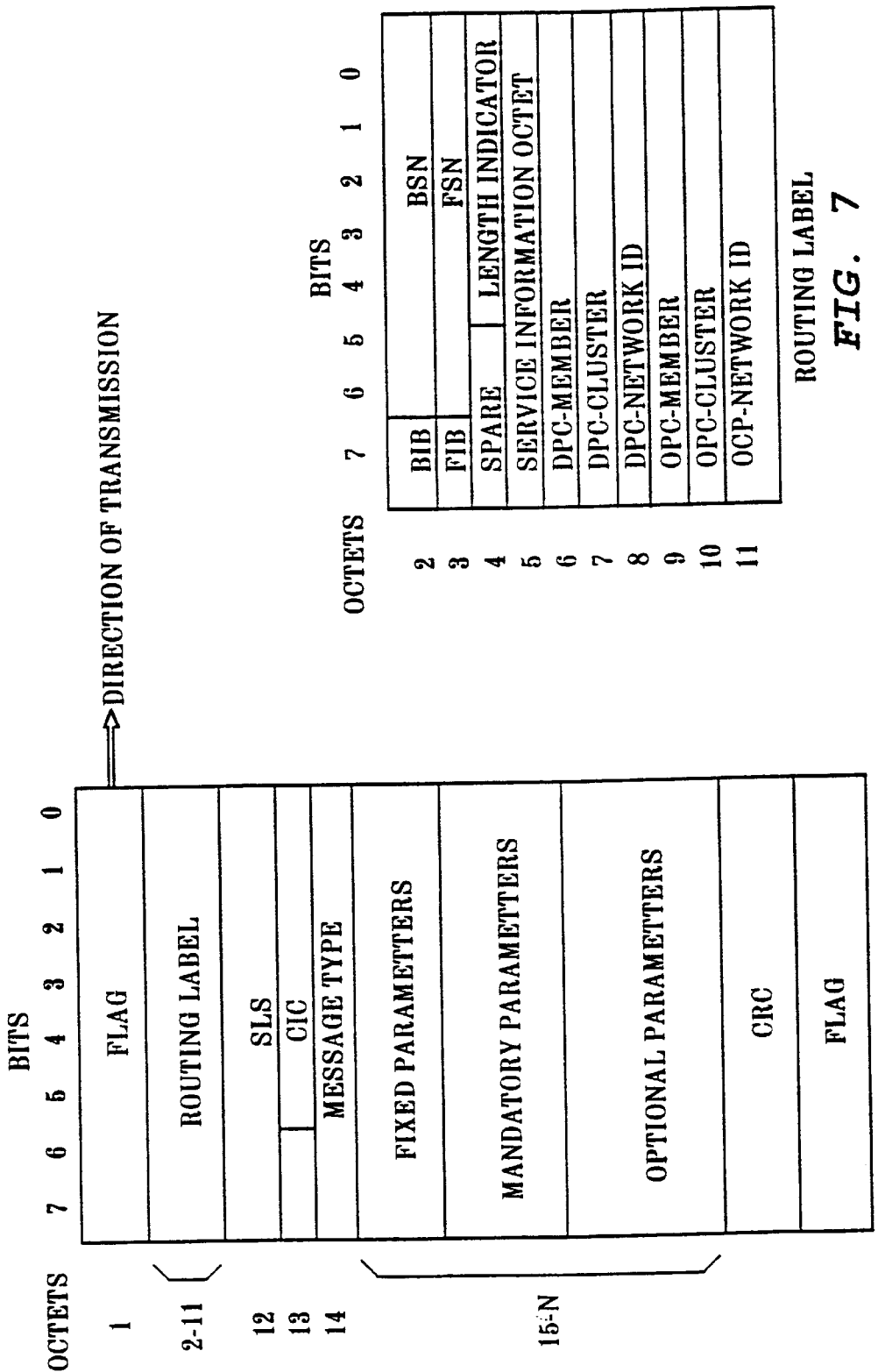
FIG. 6 illustrates in graphic form the layout of an SS7 protocol interoffice signaling message.
FIG. 7 graphically depicts the layout of the routing label portion of the SS7 message of FIG. 5.

The SS7 messages comprise digital serial messages sent to an STP for routing. FIG. 6 provides a graphic illustration of an SS7 message packet. The message is arranged in 8 bit bytes or octets. The message includes octets representing a start flag, a routing label for MTP processing and certain specialized indicators. Examples of such indicators include a Signaling Link Selection code (SLC), a Carrier Identification Code (CIC) and a message type indicator. Octets 15–N carry the information of the message in the form of fixed, mandatory and optional parameters. The lengths of the mandatory parameters field and the optional parameters field are variable. The message ends with an octet for a cyclic redundancy code for error correction, which typically is followed by the flag at the beginning of the next message.

For purposes of the MTP processing, each SS7 message includes the routing label in octets 2–11. Several of the traffic tracking studies rely on translation and/or analysis of certain addressing information from the SS7 messages, for example to identify originating offices for calls terminated in the CLEC network $3_2$. The addressing information used for the MTP and for the traffic analysis appears in the routing label.

FIG. 7 is a graphic illustration of the routing label of the SS7 message packet. The routing label includes a series of indicators, a service information octet and fields for both destination related addressing and point of origin addressing.

Octet 5 is the service information octet. This byte indicates the type of service information, for example by inclusion of a code for a Message Signaling Unit (MSU).

The origination or 'calling party' address for the SS7 packet message itself includes octets 9, 10 and 11. These 'calling party' address octets carry origination point code (OPC) information, for example member, cluster and network ID information, for the node on the SS7 network sending the message.

The destination or 'called party' address for the SS7 packet message itself includes octets 6, 7 and 8. These three octets carry destination point code (DPC) information for example member, cluster and network ID information, for the node on the SS7 network targeted to receive the message.

In operation, the translation tables stored in an STP cause the STP to actually route based on the DPC without translating any of the DPC octets into new values. The called party address octets (6–8), however, may carry other types of called party addressing information and receive different treatment by the STP, such as a global title (GTT) and subsystem number (SSN) information. The STP examines a message signaling MSU type indicator in each message to determine if there is a need for translation, e.g. from GTT to DPC, before routing the message.

In both the DPC and OPC, the member number corresponds to the carrier's network. In the example of FIG. 5, the SP capable offices 11, 13 and 17 of the LEC network $3_1$ all would utilize the same unique member number. The SP capable offices 15 and 19 of the CLEC network $3_2$ all would utilize a common member number, but that number would be unique and different from the member number used in the LEC network $3_1$. As discussed in more detail later, one feature of the CLEC traffic analysis involves translations of data from the SS7 messages into descriptive textual information, for example, to translate the member number of one or more CLECs into the name(s) of the CLEC(s).

The SS7 network constitutes a highly redundant data network, generally using 56K switched data circuits for the various links to and between the STPs. Because of the redundancy, different signaling messages for a given call may actually transit different routes through the SS7 network.

An SS7 monitoring system may be implemented on any carrier's portion of the PSTN. In the example illustrated in FIG. 5, the LEC network $3_1$ uses the monitoring and call detail compilation equipment, for the traffic tracking and competitor analysis in accord with the present invention. According to the preferred embodiments, the LEC portion of the public switching telephone network (PSTN) is provided with a traffic monitoring and analyzing system comprising monitors 31, card cages 33 and one or more site processors or servers 35, of the type described in detail in the above discussed Pester Patent. One commercial implementation of such an SS7 monitoring system is currently available from Hewlett Packard, under the product name "AcceSS7".

In the case of a CLEC every call made is an interoffice call, so that one hundred percent of LEC-CLEC calls may be recorded through monitoring of the SS7 signaling. To analyze the traffic to the CLEC network $3_2$, the monitoring takes place on the B and D links between the STP pairs 21, 23 and 25, 27. In each case the monitoring and analysis is completely transparent to the trunk circuits and the customers. However the traffic which is being investigated and monitored is the traffic on the trunks. That is, while the signaling traffic is being monitored it is to the signaling traffic itself that is a matter of concern.

FIG. 5 shows the sets of monitors or interfaces $31_1$, $31_2$ to the SS7 links to the STPs 21, 23 in diagrammatic form, as solid bold lines across respective links. A card cage $33_1$ connects the monitors $31_1$ to a site processor 35. Similarly, a card cage $33_2$ connects the monitors $31_2$ to the same or another site processor 35. The monitors 31 may be conductively or non-conductively coupled to the links to serve as passive interfaces. Alternatively, the monitors 31 may comprise active traps. The card cages 33 connect the monitors 31 to the site processor 35 for accumulation, storage and processing of the raw SS7 messages.

It is intended that multiple monitoring systems of this type serving different purposes may advantageously exist in the PSTN, for example for operations monitoring and/or fraud detection, in addition to the system illustrated for traffic tracking and competitor analysis. For simplicity and clarity, however, only a single system is here illustrated. In an actual implementation the system performing the monitoring for competitor analysis also performs monitoring for other purposes, for example to track interconnect traffic for reciprocal compensation calculations.

The SS7 signaling in a completed call typically includes an Initial Address Message (IAM), an Answer Complete Message (ACM), an Answer Message (ANM), a Release Message (REL) and a Release Complete Message (RLC). Since the common channel signaling system is intentionally redundant, the messages in a related set may be routed over different links.

Consider first a simple example of a call within the LEC network $3_1$. On a call from PC $7_A$ to ISP equipment $7_B$, the IAM may go through STP 21, whereas the ACM and ANM may just happen to go through the STP 23. The REL and RCL messages also may use different links and/or different STPs. It is therefore necessary to monitor an appropriate set of links and to reassemble the signaling pertaining to a desired transaction or signaling message set such as for a single call, to provide one call detail record or CDR. This is accomplished in the site processor 35 in a known manner as described in the Pester or Brockman et al. Patents.

It should be noted that the PSTN conducts signaling on all interoffice calls, and the monitoring system can trap messages and compile CDRs for all interoffice calls. In particular, the system provides CDRs for both calls completed to a destination station and calls that terminate without completion. For example, the system accumulates CDRs for calls that are blocked because the called line is busy, because there are no network resources available to the terminating end office (network busy), etc.

With the reassembled message sets, the site processor 35 has the data to show the called and calling stations $7_A$, $7_B$, the start time and elapsed time of the call if completed, the originating office, the terminating office, the cause of release if a call is completed and if a call is not completed, and various other detailed data. By monitoring the SS7 signaling for all of the calls originating in, terminating in or passing through a designated switch, such as the tandem switch 17, it is possible to analyze the traffic to and from the CLEC. In accord with certain preferred features of the invention, this analysis enables the LEC to identify telephone numbers of customers served by the CLEC and to analyze particularly significant patterns of the CLEC's traffic.

For example, based on a pattern of calls through the tandem 17 to a certain number, it is possible to identify the lead hunt group number of an ISP 7C, even though that ISP is served through the CLEC switch 15. Knowing that number, it is possible to gather all of the desired information about calls going to the ISP 7C via an interswitch path, including the numbers of calling customers and the number of calls or minutes of use of such calls by each customer. Conversely, knowing the number of ISP $7_B$, it is possible to collect numbers of callers to that ISP, including numbers of callers receiving service from the CLEC network $3_2$. From the usage data associated with the lead hunt group number, it is possible to estimate the number of lines that the CLEC provides to the ISP in association with that number.

From this data, the LEC can determine the number of ISP hunt groups provided by the CLEC and can estimate the number of lines in each ISP group. This provides an accurate representation of the size of customer base and the amount of services provided, to enable the LEC to make various related revenue projections. The data also indicates the number of interconnect calls to the ISPs and the connect time for such calls, which may allow the LEC to estimate the total traffic to the ISPs based on knowledge of the CLEC's other customers derived from the study.

The assemblage of the raw call detail data desired for a particular purpose occurs at the site processor level. One or more site processors 35 accumulate the CDRs for the traffic monitoring application of the present invention. Periodically, each site processor 35 transmits the latest set of CDRs over a private wide area network (WAN) 37, operated by the LEC for its internal business purposes. The WAN 37 may carry a variety of LEC network operations data. For purposes of the discussion, the WAN transports the CDRs from the site processor 35 to a server system 39 running a relational database 60 (FIG. 4) for the accumulated SS7 data.

The server system 39 comprises one or more computer systems coupled for communication over the WAN 37. The computer(s) of the server system 39 run software implementing the landing zone process 50, the relational database 60, the data preparation operation 70 and the OLAP 80. One or more computers in the server system 39 also provide communications between the OLAP program 80 and the user terminals 9, to enable the users to set-up and manage specific studies and to access results.

The CDR compilation and forwarding routine in the site processor 35 executes a special procedure for long duration calls. If a call is in progress at the point in time for the programmed uploading of CDRs to the relational database 60, say midnight, the site processor 35 creates a "call-in-progress" CDR, indicating the start time and duration of the call to that point. Later, when the call ends, the site processor creates another CDR as if the call started at the point in time (midnight) and lasted for the remaining duration of the call from that time until release.

It will be understood that some calls are completed through a single switch, such as a call from a PC (not shown) associated with the telephone 1B through the end office switch 13 to ISP 7B. Such intra-office calls will not generate the above discussed SS7 signaling and thus will not be reflected in the CDRs developed from such signaling. If a particular study requires tracking of such intra-switch calls, for example if a CLEC connects directly to a port of the end office switch, the invention may also utilize data accumulated from certain switch messages normally utilized for billing and other accounting purposes. A more detailed discussion of using automated message accounting (AMA) records as a secondary source of the CDR data appears in commonly assigned copending application Ser. No. 09/188, 712 entitled "TRAFFIC TRACK USAGE MEASUREMENT SYSTEM" filed Nov. 10, 1998, and that description is incorporated herein by reference.

The SS7 network constitutes a highly redundant data network, generally using 56K switched data circuits for the various links to and between the STPs. Because of the redundancy, different signaling messages for a given call may actually transit different routes through the SS7 network. The monitoring system is set for a given study to capture all signaling messages regarding traffic of interest for purposes of the particular type of study application. To understand this point it may be helpful to consider a series of exemplary calls, starting with a simple call and working up to the more complex case of a LEC-CLEC interconnect call.

Returning to FIG. 5, consider a study of ISP traffic as a first simple example. The intent is to capture all of the SS7 signaling messages relating to each call to an ISP. Now assume that a user places an Internet access call from the PC $7_A$ to the ISP equipment $7_B$. The call is an interoffice call, but it is a particularly simple example because it may not involve any tandem switching.

The user at PC $7_A$ activates the appropriate software routine to initiate dialing of the main number of a hunt group connected from end office 13 to the ISP equipment $7_B$. The SP end office 11 generates an Initial Address Message (IAM) with a destination point code for the end office 13 and an originating point code of the end office 11. The IAM includes a variety of information needed for call set-up, including the dialed number. The end office 11 sends the IAM either to STP 21 or to STP 23. That STP examines the address information and its translations and routes the message offer the next appropriate link, in this case over the A link to the end office 13.

In response to the IAM message, the end office 13 determines whether or not one of the lines in the hunt group corresponding to the dialed number is available. If at least one of the lines is available (not busy), the end office 13 generates an Address Complete Message (ACM) to indicate that it received the request for a call and that the called line is available. The end office 13 sends the ACM message back by simply reversing the origination and destination point codes and sending the message over an A link to one of the STPs 21, 23. The ACM may or may not go over the A link that carried the IAM to the end office 13, and it may go to the other STP of the pair. Again, the STP receiving the message examines the addresses and uses its translations to forward the message over another link to the appropriate destination, in this case the end office 11.

The end office 11 sends ringback tone over the line to the modem in the calling PC $7_A$. At about this time, the end office $7_B$ applies a ringing signal to the line to the called station $7_B$. If the PC $7_A$ provides audio output, the calling party may hear a ringback tone, and the caller and her data equipment await an answer.

The ISP equipment $7_B$ detects the ringing signal, and if operative, that equipment establishes an off-hook condition on the line to answer the incoming call. The end office 13 detects this new condition as an answer and interrupts the ringing signal on that line. The end office 13 also sends an Answer Message (ANM) back through the SS7 network to the end office 11, indicating that the called station $7_B$ has answered.

At that time the necessary trunk circuits between the end offices are connected together and assigned to the call. The trunk connection may run through the tandem 17, which would require separate call set-up and signaling for each leg of the call to and from the tandem. In this simplified example, assume that the trunk connection extends directly between the end offices. The end office 11 connects the line for the PC $7_A$ to the trunk circuit, and the end office 13 connects the line for the ISP equipment $7_B$ to the trunk circuit. At this point a complete voice-grade telephone connection exists between the two data devices, and the data devices can exchange modulated audio signals carrying various data between the user on PC $7_A$ and the Internet accessed through equipment $7_B$. Hours later, when one of the parties terminates the session, the offices 11, 13 exchange REL and RLC messages via either of the STPs 21, 23 as part of the procedure for tearing down the call connection over the trunk circuit.

To capture all of the interoffice signaling messages relating to the call, the card cages 33 are set so that the monitors 31 capture A-link signaling messages to and from one or both of the offices 11, 13. For a study of overflow interoffice traffic through the tandem, the card cages 33 are set so that the monitors 31 capture A-link signaling messages going to and from the tandem 17. For the exemplary call, the site processor 35 compiles a CDR from the complete set of SS7 messages relating to that call.

Now consider a more complicated situation, as it relates to traffic of the competing carrier.

Calls crossing the interface between the LEC network $3_1$ and the CLEC network $3_2$ go through the tandems 17 and 19. Typically, this requires a leg through the originating office to the tandem of the originating carrier, a leg between the tandems and a leg from the tandem of the terminating carrier through an end office of that carrier to the destination station. For example, if the user at PC $7_A$ now calls the ISP $7_C$, the first leg of the call extends to the tandem 17. The second leg extends between the tandems 17 and 19, and the final leg extends from the CLEC tandem 19 through the end office 15. Calls to and from other carriers' networks that use the LEC network $3_1$ to access the CLEC network $3_2$ would include similar legs, particularly the leg between the tandems 17, 19. Each leg of any such call entails interoffice signaling similar to that discussed in our first example of a simple intra-carrier call between $7_A$ and $7_B$. It would be possible to capture A link signaling messages of the end offices. However, it is preferred to capture B and D link signaling messages on the leg of the call between the tandems, i.e. across the actual interface between the two carriers' networks.

For this purpose, the LEC can configure remotely on the B and D links from the LEC's STP pair 21, 23 to the STP pair 25, 27 serving the CLEC. Specifically, the study management application running in the OLAP routine 80 (FIG. 4) remotely accesses the site processor 35 to configure on the B and D links and specify a study period for collecting all the records on those links. Depending on the intent of the study, the management application may instruct the site processor 35 to capture messages relating either to calls originating in the LEC network, calls terminating in the LEC network or both.

Figure 8:
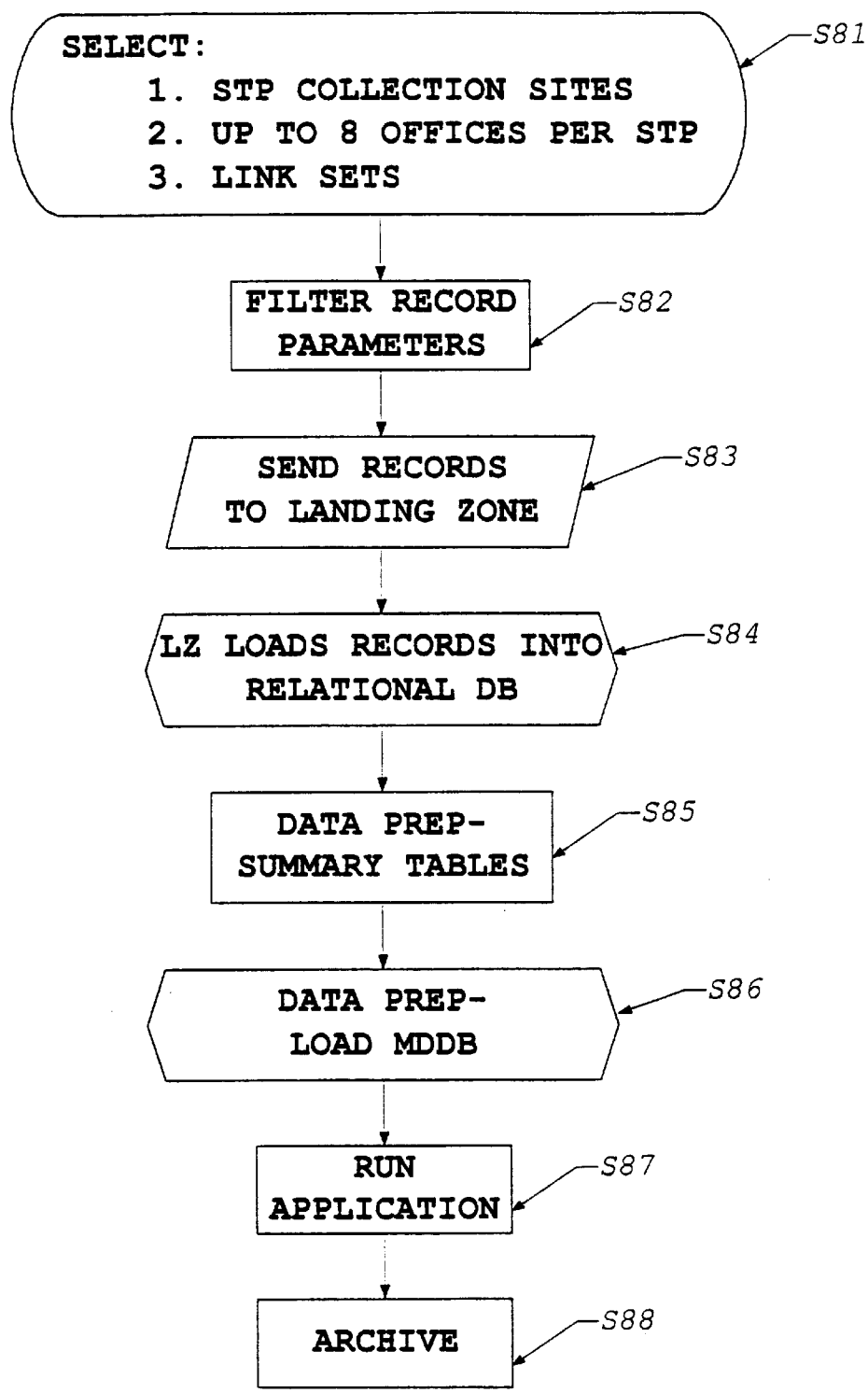
FIG. 8 is a flow chart illustrating the high-level process of overall management of a traffic track study, such as a traffic study to quantify the number of lines or the like served through another carrier's network.

FIG. 8 is a flow chart depicting the overall flow of study management. This study process flow applies to any type of study conducted through the traffic track system, including management of interconnect traffic studies of CLECs for business analysis and the like. As shown at step S81, the process essentially begins with the user inputting a number of study selections. Consider a study based on monitoring of interoffice signaling, for example to study interconnect traffic to and from the CLEC network $3_2$. Such a study would involve input of the three selections, the signal transfer point (STP) collection sites, a number of offices associated with each STP (up to 8 per STP) and the link sets to be monitored. In the CLEC study example, this preferably sets the system to monitor the B and D links between the two STP pairs 21, 23 and 25, 27 for interconnect traffic through the tandem office 17.

The network elements monitor the records, and filter the records by parameters (S82), based on the input selections. For the CLEC study, the site processor will compile the CDRs for calls over the trunks between the tandems 17, 19, i.e. the calls interconnected between the networks $3_1$, $3_2$. In step S83, the monitoring equipment transmits the records (CDRs) to the landing zone 50. The landing zone process 50 loads the records into the tables for this study established in the appropriate relational database 60 (step S84).

A two-dimensional database record such as a CDR is just a flat file. A two-dimensional database has individual tables, created for a given collection. The relational database 60, for example for interoffice signaling records, stores Call Detail Records (CDRs) for millions of calls relating to a particular traffic study. In a study for traffic to and from the CLEC, the table would contain CDRs compiled from the SS7 messages on the B and D links between the STP pairs. The landing zone process 50 for the SS7 records takes all of those Call Detail Records and loads them into one or more tables set up for the exemplary study. Such a table includes every Call Detail Record and every dimension or piece of information within the individual Call Detail Records in a linear form. As a result of the landing zone processing 50, there is a table, within the table there is CDR 1, CDR 2, etc., and within each CDR there are X dimensions for the X different items of information within each CDR.

In the relational database 60, the call detail records include study identifiers and a study "type" flag. The identifiers can be used to identify the particular studies to which the records relate. The study type flag indicates the general type of the particular study, e.g. tandem, Internet, CLEC accounting, competitive analysis, etc. Preferably, the software running in the site processor(s) 35 adds the study identifiers and the study "type" flags to the call detail records before supplying the records through the landing zone procedure 50 to the relational database 60.

The data preparation routine 70 prepares a staging table and possibly one or more summary tables (S85). This involves various translations using reference data, the binning or spreading of records to properly allocate usage time and the loading of data into the appropriate tables. The staging table includes all of the CDRs, as enriched in the data preparation stage. A summary table contains summary information accumulated from the enriched CDRs. The data preparation routine 70 loads the tables into the MDDB 81 (S86).

Within the MDDB software, a study application is run to present the data to the user (S87). The study application corresponds to the particular type of study, e.g. tandem, Internet heavy user finder, ISP finder, etc. In our example, the study application relates to one of several types of studies of traffic interconnected to or from a CLEC for competitive analysis. The study results also are archived (S88) for future reference. If necessary for the particular study, e.g. for CLEC billing reconciliation, the archiving may include the original record data from the relational databases.

Although not shown, upon completion of the particular study, the application running on the MDDB may enable the user to access other data. For example, in an application which identifies end user telephone numbers, such as an ISP finder application or an Internet user finder application, such other data sources might provide the name and address of each identified user. This might enable the LEC to market certain services to the identified parties, for example to market the LEC's new Asynchronous Digital Subscriber Line (ADSL) services to high end caller's to the ISP $7_c$ served through the CLEC network $3_2$ and/or to market T1 or higher rate services to the ISP served by the CLEC. Examples of such other databases 83 include CRIS, LMOS and LIDB.

Figure 9:
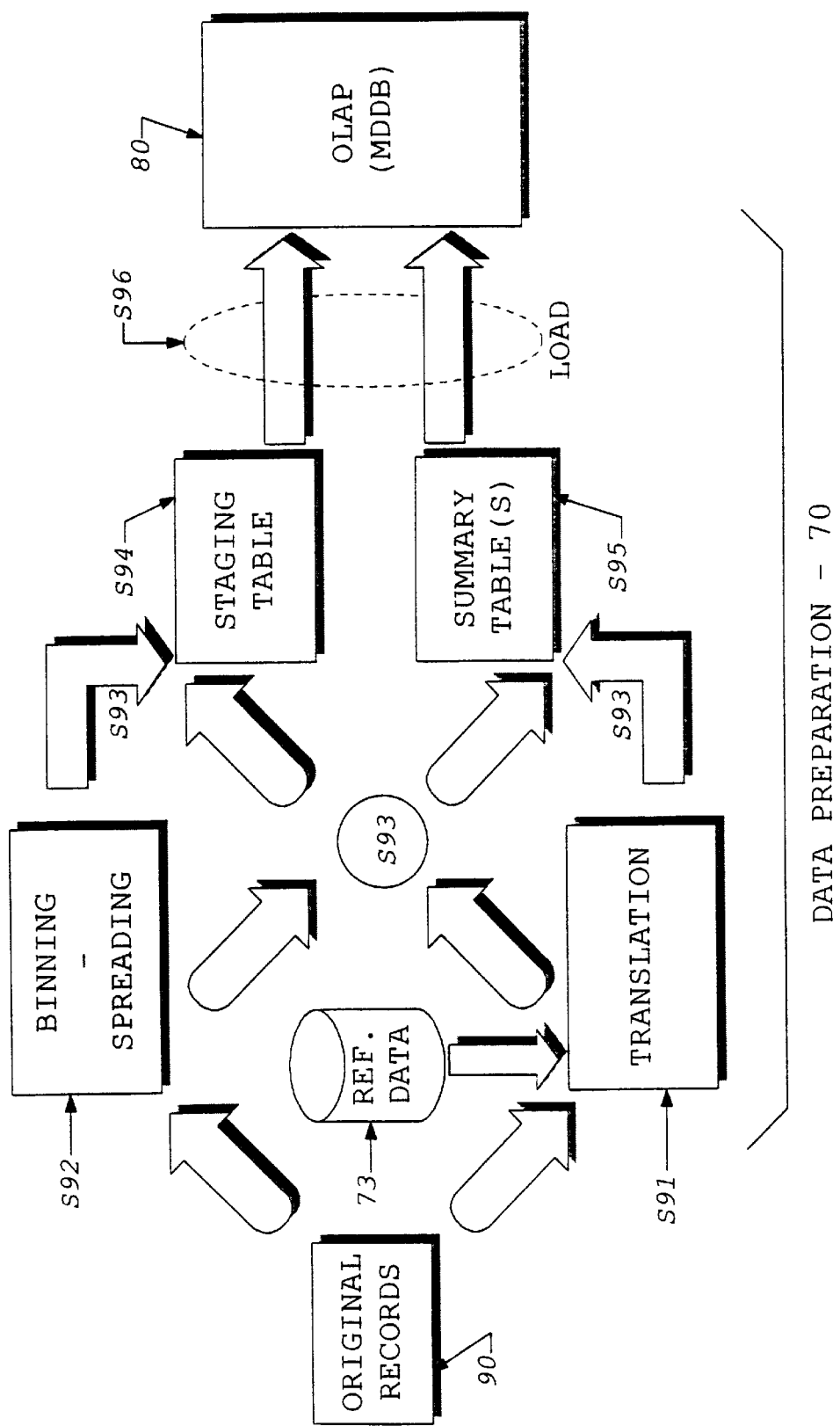
FIG. 9 is a flow chart useful in explaining the operations involved in data preparation in the traffic track system.

FIG. 9 is a high-level process flow diagram depicting the operation of the data preparation routine 70. As noted, data preparation involves essentially three major functions, data translation, binning and assignment of records to tables.

In step S91, the original records 90 from the relational database 60, preferably CDRs compiled from monitoring of interoffice signaling messages, can be translated using external reference data (73). Typically, the reference data 73 provides a translation of the data elements from a raw form to some more useful form. For example, in this process, the software may take the OPC or DPC address information from the interoffice signaling messages or the NPA-NXX digits from telephone numbers included in the records and access associated reference data 73. The reference data would provide translations of the record information into the common language location identifier (CLLI) codes for identification of the serving switches. In this way, the enhanced records would provide descriptive identification of the switch serving the caller and/or the switch serving the called party for each recorded call.

The data preparation program 70 also executes an algorithm for binning or spreading of usage data from the records, to properly allocate usage that may extend over multiple hours to the appropriate hourly time periods (S92). For engineering purposes, it is important to know traffic loads by hours, particularly to identify typical peak busy hours and determine loads during such hours. As discussed earlier, the process for distinguishing the number of lines in a group preferably uses total connect time in a peak hour. Categorizing calls and CDRs by hours is significant here because CDRs often relate to calls that can span hours. For these reasons, a significant operation of the data preparation process is to make sure that the calls are binned into the hours of the actual usage.

For example, an Internet access call might start from PC 7A to ISP 7C at 8:15 PM and last until release at 10:20 PM. As such, the start-time hour would be the hour from 8 to 9 PM, but all of the minutes of use for the call should not appear to in that one hour. The binning process allocates 45 minutes of use in the 8 to 9 o'clock hour, 60 minutes in the 9 to 10 o'clock hour, and then 20 minutes in the 10 to 11 o'clock hour. To achieve this accurate binning of calls from the CDRs, the data preparation operation goes through every single CDR, examines the start time and duration and applies minutes of usage into the correct hour of the day.

The binned results enable the LEC personnel to analyze traffic by hours, for example to identify the peak busy hour for a CLEC and to identify the peak busy hour for Internet access traffic into that CLEC's network. Identification of hunt group numbers together with a usage associated with each number during the busy hour allows the LEC to estimate the number of CLEC lines in each hunt group.

At step S93 (shown as multiple transfer arrows) the enhanced records resulting from the translation (S91) and the binning (S92) are compiled into one or more predefined tables, by application type. In the illustrated embodiment, the data preparation program 71 generates a staging table (S94) and one or more summary tables (S95). The staging table contains the complete enriched record information, whereas a summary table contains a more limited set of information to provide a desired summary of certain aspects of the traffic. For example, for the CDRs formed from monitoring of SS7 interoffice signaling, the staging table is the primary table used for binning all of the calls. The binned results also are forwarded to a second table or to a third table for summaries prior to input into the Gentia implementation of the MDDB 80. Other commonly used SS7 CDR summary tables include an "Office_Pair" table for tandem studies and CLEC studies and an "Office_Summary" table for end office studies.

At step S96, the data preparation routine 70 uploads the resulting tables into the OLAP program 80, in the preferred embodiment, the MDDB.

A more detailed description of the major functions of the data reparation procedure may be found in the above-discussed application Ser. No. 09/188,712, and the detailed disclosure of that procedure from that application is entirely incorporated herein by reference.

The data preparation routine may be written in PL/SQL language. The data preparation routine 70 preferably runs on the same computer that maintains the relational database and effectively runs on top of the relational database application 60. The data preparation process 70 accesses additional reference data 73 that may reside in the same or a separate computer system.

The data preparation function is an automatic process. Although there are some common aspects for all studies, data preparation preferably is adapted to different types of studies.

To enable the automatic data preparation function, as part of the initial set-up of a study, the CDR data from particular sources is pointed at the appropriate data preparation function based on the study-type flag in each CDR. In a study of a competitor's traffic over the interface between the tandems, for example, the data captured by the SS7 monitors 31 and the site processor 35 goes through the competitive analysis version of the data preparation process 70.

Each study runs for some pre-determined period of time selected by the user. The results, however, are available in real or near real-time. The post collection processing could take several days or a week, depending on available processing power. Preferably, results will be available overnight. For example, if a user sets up a study on interconnect traffic for calls into the CLEC network $3_2$ for Sep. 10, 1998, the study begins at midnight, data is uploaded to the server system 39 periodically for the 24-hour period on that date. The SS7 data records are collected into the landing zone 50 at midnight and uploaded into the relational database 60. Then the data preparation 70 for the new CDRs begins at one o'clock (AM) the next morning and finishes loading into the MDDB 80 about four o'clock (AM). The results of the study are available to the user at the beginning of the next business day, e.g. nine AM Sep. 11, 1998. For a study over a longer period of time, e.g. a month long study for purposes of capture of a competitor's active customer addresses, the user can access the latest results each morning.

A CLEC study for purposes of analyzing trends in the CLEC's competing business preferably runs continuously in one-month cycles. However, if the data processing for this purpose is deemed too expensive, this type of study may be run for shorter intervals on some periodic basis, for example for one week once each quarter. As noted, intermediate results are available daily. Other studies regarding CLECS, for example to identify ISPs served by the CLECs and distinguish number of lines per hunt group, can run for different time periods, for example, for one to three days.

The collection and processing of the CDRs relating to interconnect traffic may be collected and processed solely for purposes of the study of the competitor's business and forecasting of impacts of changes in that business on the carrier's own business. Preferably, at least the data collection runs together with other studies of the interconnect traffic. For example, the carrier may elect to continually study interconnect traffic to and from a particular CLEC on a monthly basis, for example to reconcile accounting between the LEC and the CLEC for billing purposes. The analysis of the CLEC's customer base and different types of customers or access lines within the CLEC's network, in accord with the invention, could utilize the same raw CDRs collected for accounting purposes.

Consider now the execution of the study management process, specifically for a study of interconnect traffic between the networks $3_1$, $3_2$. As noted earlier, for a CLEC study, the LEC user can configure the monitors 31 and the card cages 33 remotely on the B and D links from the LEC's STP pair 21, 23 to the STP pair 25, 27 serving the CLEC. Depending on the intent of the study, the management application may instruct the site processor to execute a filter operation so as to cull out those CDRs relating either to calls originating in the LEC network or calls terminating in the LEC network or both.

In operation, the monitors and card cages supply the messages from the designated B and D links to the site processor 35. The site processor 35 in turn performs the selected filtering operation. The site processor 35 transmits the CDRs through the WAN 37 to the server system 39. In the server system 39, the landing zone 50 loads the CDRs for this study into the appropriate table in the relational database 60.

As discussed above relative to FIG. 7, every message transmitted across the SS7 common channel interoffice signaling network includes a routing label containing both origination and destination address information. Specifically, the routing label includes a destination point code and an originating point code. Each signaling point (SP) on the SS7 network has a point code address, comprising a 9-digit point code. The 9-digit code is the originating point code, for all messages that the SP sends, and the 9-digit code is the destination point code for all SS7 messages sent to the SP. Each operating company has its own network ID, which serves as the first three digits (member number) of the point codes of the SPs of that carrier's network. The origination point code is one of the dimensions or fields in a Call Detail Record. Another dimension relates to the destination point code.

Once the relevant CDR data is in the relational database 60, it is possible to write programs against the relational database. In accord with the invention, one particular application extracts all the records for calls originating or terminating within the CLEC network $3_2$ and captures CLEC numbers from the CDRs. The captured numbers are network identifiers or addresses associated with the CLEC's customers. The identifiers include CLEC calling numbers for calls originated by the CLEC customers, and CLEC called numbers for calls originated outside the CLEC network but destined for the CLEC's customer lines. The application produces a cumulative list of numbers, for each CLEC studied. Updating of the study periodically enables the application to compile data relating to changes in the cumulative list, such as new numbers and numbers that apparently have gone out of service.

The application also finds hunt groups. Different types of hunt groups can be distinguished by different patterns of traffic, indicated in the aggregate data, as discussed above. The application implements a model to convert hunt group information to an estimate of the number of member lines in each hunt group. Hunt groups over a given size are assumed to use DS1 service or higher.

The inventive traffic track system provides an efficient, cost-effective means of recording usage measurements for interconnect traffic, particularly for interconnect traffic. The system enables collection and storage of large volumes of call detail data, and further, provides personnel real-time access to information without time consuming analysis of AMA billing information or costly end office switch upgrades. It has been found that the system can collect all originating and terminating CDRs for a potentially competing carrier (off the Interconnecting SS7 links), and process these CDRs to clearly identify various traffic characteristics. Basic network usage MOU and peg count measures can be calculated to various levels (time-of-day, Day-of-Week) and directions.

LECs and other carriers must have the capability to monitor, document, trend, and audit the explosive growth of competitive traffic and significant patterns of such traffic. As shown by the above description and the drawings, the inventive traffic track system provides the necessary capabilities and allows one carrier to analyze another carrier's business from interconnect traffic. From an analysis of the interconnect traffic, the invention enables the one carrier to estimate the customer base of the other carrier and certain types of customers or services within the other carrier's network.

The traffic track technology described in detail above has applied to analysis of the interconnect traffic through the PSTN. However, the technology may be adapted to study other types of telecommunication networks, such as cell or packet data networks, etc.

As described above, the SS7 monitoring system traps, messages from identified links going to and from the STPs and compiles records from those messages at the site processor level. Other forms of monitoring of the interoffice signaling fall within the scope of the invention. For example, the function of the site processors might be rolled up into processor functions on the card cages. Also, a number of STP vendors have products that can supply message copies to monitoring ports, such that the STP itself performs the trapping function.

The above processing examples concentrated on estimation of customer base and changes in the customer base from captured telephone numbers. The exemplary network was a telephone network, however, as noted earlier, the invention is applicable to other types of networks. Other networks may use other customer addresses or identifiers. The invention encompasses compilation of lists of other forms of addresses associated with the competing carrier's customers, from the detailed records of the interconnect traffic.

From the foregoing it may be seen that the systems and methodologies of the present invention provide a powerful and flexible tool for performing varying investigations and surveillance across the boundaries between carriers' networks. Thus, as examples, it is feasible to determine the size and changes in a competing carrier's actual customer base. Also, from patterns in the interconnect traffic between two carriers, it is possible for one carrier to distinguish between different types of customers or services within the other carrier's network. The traffic track system also allows the carrier to accurately measure the volume of traffic, the origin and destination of traffic, identify ISPs, determine the source of the largest amount of traffic to the identified ISPs, and from that information determine optimal solutions to accounting, congestion and overloading problems.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method comprising the steps of:
   capturing management data messages communicated by a first exchange carrier's telecommunication network during processing of calls associated with a second exchange carrier's telecommunication network during a predefined study period;
   creating a record of each of a plurality of calls interconnected between the first exchange carrier's telecommunication network and the second exchange carrier's telecommunication network during the predefined study period from the captured management data messages communicated by the first exchange carrier's telecommunication network; and
   compiling a list of addresses of a set of customers from the records of the calls, wherein the set of customers consists of customers of the second exchange carrier's telecommunication network.

2. A method as in claim 1, wherein the step of capturing comprises trapping signaling messages exchanged between the first carrier's telecommunication network and the second carrier's telecommunication network during processing of each interconnected call.

3. A method as in claim 2, wherein the signaling messages comprise common channel interoffice signaling messages.

4. A method as in claim 1, wherein:
   the first carrier's telecommunication network comprises a switched telephone network; and
   the interface comprises a trunk connection to a tandem switching office of the switched telephone network.

5. A method as in claim 1, wherein the addresses comprise telephone numbers associated with customers of the second carrier's telecommunication network.

6. A method as in claim 1, further comprising:
   generating at least one aggregate traffic parameter with respect to addresses of customers of the second carrier's telecommunication network; and
   identifying addresses of customers of the second carrier's telecommunication network for which the aggregate traffic parameter meets a predetermined condition signifying a particular pattern of traffic.

7. A method as in claim 6, wherein:
   the parameter is a measure of usage during an interval; and
   the predetermined condition comprises a threshold value signifying a high amount of usage during the interval.

8. A method as in claim 7, wherein the interval corresponds to the predefined study period.

9. A method as in claim 7, wherein the interval comprises a peak hour.

10. A method as in claim 7 wherein the measure of usage relates to usage on incoming calls.

11. A method as in claim 1, further comprising identifying a subset of the addresses as candidate addresses, wherein each one of the identified addresses is included in the subset as a candidate address if number of calls and total amount of connect time for calls to the one identified address satisfies criteria indicating a target traffic pattern.

12. A method as in claim 11, wherein:
   the criteria comprises a relationship between the number of calls and the total connect time for calls to the one identified address signifying a long average hold time; and
   the target traffic pattern relates to data calls interconnected to the second carrier's telecommunication network.

13. A method as in claim 11, further comprising:
   for each candidate address in the subset, analyzing records of calls interconnected from the second telecommunication network to determine if there were any outgoing calls from a station associated with the candidate address; and
   deleting any numbers from the subset if there were any outgoing calls from a station associated therewith.

14. A method as in claim 1, wherein the step of processing comprises:
   loading the records of interconnect calls into a table in a database;
   enhancing the records in the database table;
   loading the enhanced records into an on-line analytical processing system; and
   running a pre-defined study application in the on-line analytical processing system to present specified analytical study results, including the list, based on the enhanced records.

15. A method as in claim 14, wherein the step of enhancing comprises translating at least one item of information from the records in the database table into descriptive information using external reference data.

16. A method as in claim 14, wherein the step of enhancing comprises spreading usage data contained in the records in the database table of calls extending over a plurality of predetermined intervals into bins associated with the predetermined intervals.

17. A method as in claim 14, wherein:
the database comprises a relational database; and
the on-line analytical processing system comprises a multi-dimensional database.

18. A method as in claim 1, wherein the first carrier's telecommunication network comprises a telephone network of a local exchange carrier.

19. A method as in claim 18, wherein the second carrier's telecommunication network comprises a network selected from the group consisting essentially of: an interexchange carrier's network, a cellular provider's network, and a competing local exchange carrier's network.

20. A method of enabling an exchange carrier to analyze a competing carrier, comprising the steps of:
trapping signaling messages exchanged between a telephone network of the exchange carrier and a telephone network of the competing carrier during processing of calls associated with the competing carrier's telephone network by the exchange carrier's telephone network;
processing the trapped signaling messages to form call detail records for each of a plurality of calls associated with the competing carrier's telephone network processed by the exchange carrier's telephone network; and
processing the call detail records to form a list of identifiers associated with a set of customers, the set of customers consisting of customers of the competing carrier.

21. A method as in claim 20, wherein the identifiers comprise telephone numbers assigned to the customers within the competing carrier's telephone network.

22. A method as in claim 20, further comprising repeating the steps of trapping signaling messages and processing the trapped signaling messages to form additional call detail records after a predetermined interval, and measuring a change in the list of identifiers associated with customers of the competing carrier from the list and said additional call detail records.

23. A method as in claim 22, wherein the change comprises a gain of customers by the competing carrier.

24. A method as in claim 22, wherein the change comprises a loss of customers by the competing carrier.

25. A method as in claim 20, wherein the trapped signaling messages comprise common channel interoffice signaling messages.

26. A method of enabling an exchange carrier to analyze a competing carrier, comprising the steps of:
trapping signaling messages exchanged between a telephone network of the exchange carrier and a telephone network of the competing carrier during processing of calls associated with the competing carrier's telephone network by the exchange carrier's telephone network;
processing the trapped signaling messages to form call detail records for each of a plurality of calls associated with the competing carrier's telephone network processed by the exchange carrier's telephone network;
processing the call detail records to derive aggregate traffic data for calls to or from network identifiers associated with customers of the competing carrier; and
analyzing the aggregate traffic data to form a list of a plurality of the network identifiers for which the aggregate traffic data shows a traffic pattern associated with a particular type of service offered through the competing carrier's telephone network.

27. A method as in claim 26, wherein the step of analyzing comprises recognizing identifiers of customers of the competing carrier for which aggregate traffic data associated with each of the recognized identifiers satisfies the following conditions:
high number of incoming calls to the identifier; and
no outgoing calls associated with the identifier.

28. A method as in claim 27, wherein each of the recognized identifiers further satisfies the following conditions:
high aggregate usage associated with the identifier; and
long average hold time for calls associated with the identifier.

29. A method as in claim 26, wherein the step of analyzing comprises recognizing identifiers of customers of the competing carrier for which aggregate traffic data associated with each of the recognized identifiers satisfies the following conditions:
short average hold time for calls associated with the identifier; and
incoming and outgoing calls associated with the identifier.

30. A method as in claim 29, wherein each of the recognized identifiers further satisfies the following conditions:
high number of calls associated with the identifier; and
high aggregate usage associated with the identifier.

31. A method as in claim 26, wherein the trapped signaling messages comprise common channel interoffice signaling messages.

32. A system comprising:
a monitoring system for association with a first exchange carrier's telecommunication network for capturing management data messages communicated during processing of calls to a second exchange carrier's telecommunication network by the first exchange carrier's telecommunication network;
a processor for receiving the captured management data messages from the monitoring system and for compiling a detailed record of each of a plurality of interconnect calls between the first exchange carrier's telecommunication network and the second exchange carrier's telecommunication network from the captured management data messages;
a database for storing the detailed records of the interconnect calls in a table; and
a processing system, operating on the database table, for processing the detailed records of the interconnect calls to form a list of identifiers associated with a set of customers, the set of customers consisting of customers of the second exchange carrier.

33. A system as in claim 32, wherein:
the database comprises a relational database; and
the processing system comprises a multidimensional database.

34. A system as in claim 33, wherein the processing system further comprises a study application running on the multi-dimensional database, for aggregating data indicative of a predetermined characteristic of the interconnect traffic.

35. A system as in claim 32, wherein the monitoring system comprises monitors, coupled to interoffice signaling links between the first carrier's telecommunication network and the second carrier's telecommunication network, for supplying captured interoffice signaling messages to the processor.

36. A system as in claim 35, wherein the monitors trap signaling system 7 protocol messages.

37. A system comprising:

a monitoring system for association with a first exchange carrier's telecommunication network for capturing management data messages communicated during processing of calls to a second exchange carrier's telecommunication network by the first exchange carrier's telecommunication network;

a processor for receiving the captured management data messages from the monitoring system and for compiling a detailed record of each of a plurality of interconnect calls between the first exchange carrier's telecommunication network and the second exchange carrier's telecommunication network from the captured management data messages;

a database for storing the detailed records of the interconnect calls in a table; and a processing system, operating on the database table, for:
  (a) processing the detailed records of the interconnect calls to derive aggregate traffic data for calls to or from network identifiers associated with customers of the second exchange carrier, and
  (b) analyzing the aggregate traffic data to form a list of a plurality of the network identifiers for which the aggregate traffic data shows a traffic pattern associated with a particular type of service offered through the second exchange carrier's telecommunication network.

38. A system as in claim 37, wherein:

the database comprises a relational database; and the processing system comprises a multi-dimensional database.

39. A system as in claim 38, wherein the processing system further comprises a study application running on the multi-dimensional database, for analyzing the aggregate data to detect the pattern.

40. A system as in claim 37, wherein the monitoring system comprises monitors, coupled to interoffice signaling links between the first carrier's telecommunication network and the second carrier's telecommunication network, for supplying captured interoffice signaling messages to the processor.

41. A system as in claim 40, wherein the monitors trap signaling system 7 protocol messages.

* * * * *